(12) United States Patent
Narayana Iyer et al.

(10) Patent No.: US 8,615,750 B1
(45) Date of Patent: Dec. 24, 2013

(54) OPTIMIZING APPLICATION COMPILING

(75) Inventors: Anantharaman P. Narayana Iyer, Bangalore (IN); Daniel Dura, Garland, TX (US); Christian Cantrell, Sterling, VA (US)

(73) Assignee: Adobe Systems Incorporated, San Jose, CA (US)

( * ) Notice: Subject to any disclaimer, the term of this patent is extended or adjusted under 35 U.S.C. 154(b) by 1201 days.

(21) Appl. No.: 12/483,356

(22) Filed: Jun. 12, 2009

(51) Int. Cl.
*G06F 9/44* (2006.01)

(52) U.S. Cl.
USPC ........... 717/159; 717/140; 717/141; 717/136; 717/114; 709/203

(58) Field of Classification Search
USPC .......... 717/114, 116, 136–160; 709/201–203; 719/317, 330
See application file for complete search history.

(56) References Cited

U.S. PATENT DOCUMENTS

| | | | | |
|---|---|---|---|---|
| 5,887,172 | A * | 3/1999 | Vasudevan et al. | 719/328 |
| 6,629,128 | B1 * | 9/2003 | Glass | 709/203 |
| 7,689,979 | B1 | 3/2010 | Sawyer et al. | |
| 2004/0040012 | A1 * | 2/2004 | Barsness et al. | 717/123 |
| 2004/0143823 | A1 * | 7/2004 | Wei | 717/140 |
| 2005/0273792 | A1 * | 12/2005 | Inohara et al. | 719/330 |
| 2007/0226709 | A1 * | 9/2007 | Coker et al. | 717/140 |
| 2010/0131951 | A1 * | 5/2010 | Carteri et al. | 718/100 |

OTHER PUBLICATIONS

"TMS320C3x/C4x Optimizing C Compiler User's Guide." Texas Instruments, Jun. 1998, 17 pages.
"Code Optimization with IBM XL Compilers." IBM, Jun. 2004, 23 pages.
"Compiler optimization" [online]. Wikipedia, 2007 [retrieved on Nov. 2, 2011]. Retrieved from the internet: <URL: http://web.archive.org/web/20071113133103/http:/en.wikipedia.org/wiki/Compiler_optimization>.

* cited by examiner

*Primary Examiner* — Lewis A Bullock, Jr.
*Assistant Examiner* — Tina Huynh
(74) *Attorney, Agent, or Firm* — Moser Taboada

(57) ABSTRACT

A computer implemented method includes receiving a client programming language input and a server programming language input, processing the client and server programming language inputs, and translating the client programming language input into an executable client application and the server programming language input into an executable server application, the executable client and server applications operable to communicate with each other. Processing the client and server programming language inputs includes identifying any invocations of server procedures of the server programming language input in the client programming language input, producing a combined server procedure in the server programming language input for identified server procedures invoked by the client programming language input, and replacing invocations of the identified server procedures in the client programming language input with an invocation of the combined server procedure.

21 Claims, 21 Drawing Sheets

```
doSomethingInClient(serverMath c)
{
  int a, b, result;
  a = 10; b = 20;
  result = c.add(a, b);
  Alert.show("a + b = " + result.toString());
}
```

312 { (left brace for above block)

```
<mx:TextInput id="un" />
<mx:TextInput id="pw" />
<mx:Button label="login"
click="Alert.show(authenticate(un.text,
pw.text).toString());"/>
<mx:ServerScript>
[[CDATA
public function authenticate(u, p):Boolean
{
  if (u == "a") && (p == "p") return(True); else
return(False);
}
]
</mx:ServerScript>
```

```
Client code
<mx:Script>
private function clientFunction( ):void
{
private var a, c: String;
a = "the version of server";
c = a + b;
}
</mx:Script>
Server code
<mx:ServerScript>
public var b:String = "version 1.0";
private function serverFunction( ):void
{
//server code here
}
</mx:ServerScript>
```

312 { (Client code section)
314 { (Server code section)
310

FIG. 7A

```
Client code
private function initArray( ):void
{
var x:Array = new Array(1000)
for (int i =0; i<1000; i++)
{
x[i] = a;
}
}
Server code
<mx:ServerScript>
var a:int = 100;
</mx:ServerScript>
```

312 { (Client code section)
314 { (Server code section)
310

FIG. 7B

OPTIMIZING APPLICATION COMPILING

BACKGROUND

This disclosure relates to optimizing compilation of an input into a distributed software application. A software developer typically uses an integrated development environment (IDE), also known as integrated design environment or integrated debugging environment, for developing software applications. An IDE generally provides comprehensive facilities for software development and normally includes a source code editor, a compiler and/or interpreter, build automation tools, and a debugger. Sometimes a version control system and various other development tools are integrated into the IDE to simplify the construction of a graphical user interface (GUI). Some IDEs also have a class browser, an object inspector, and a class hierarchy diagram, for use with object oriented software development.

Software applications, such as rich internet applications (RIAs), which are web applications that generally have the features and functionality of traditional desktop applications, may include client and server portions for execution on a respective client computing device and a server computing device. RIAs typically form a stateful client application with a separate services layer on the backend. RIAs typically run in a web browser, or do not require software installation on a local machine, and run locally in a secure environment called a sandbox. A sandbox is generally a security mechanism for safely running programs. Sandboxes are often used to execute untested code, or non-trusted programs from unverified third-parties, suppliers and non-trusted users. An IDE may be used to develop an RIA and to manage the client and server portions of the application.

SUMMARY

In general, in one aspect, a computer implemented method includes receiving a client programming language input and a server programming language input, processing the client and server programming language inputs, and translating the client programming language input into an executable client application and the server programming language input into an executable server application, the executable client and server applications operable to communicate with each other. Processing the client and server programming language inputs includes identifying any invocations of server procedures of the server programming language input in the client programming language input, producing a combined server procedure in the server programming language input for identified server procedures invoked by the client programming language input, and replacing invocations of the identified server procedures in the client programming language input with an invocation of the combined server procedure.

These and other implementations can optionally include one or more of the following features. In some implementations, the method includes producing a communication service that marshals information between the executable client and server applications to support the combined server procedure. The method may include identifying any invocations of client procedures of the client programming language input in the server programming language input, producing a combined client procedure in the client programming language input for identified client procedures invoked by the server programming language input, and replacing invocations of the identified client procedures in the server programming language input with an invocation of the combined client procedure. In some examples, the method includes producing a communication service that marshals information between the executable client and server applications to support the combined client procedure.

In general, another aspect of the subject matter described in this specification can be embodied in a computer program product, encoded on a computer-readable medium, operable to cause a data processing apparatus to perform operations that include receiving a client programming language input and a server programming language input, processing the client and server programming language inputs, and translating the client programming language input into an executable client application and the server programming language input into an executable server application, the executable client and server applications operable to communicate with each other. Processing the client and server programming language inputs includes identifying any invocations of server procedures of the server programming language input in the client programming language input, producing a combined server procedure in the server programming language input for identified server procedures invoked by the client programming language input, and replacing invocations of the identified server procedures in the client programming language input with an invocation of the combined server procedure.

These and other implementations can optionally include one or more of the following features. In some implementations, the operations performed by the data processing apparatus include producing a communication service that marshals information between the executable client and server applications to support the combined server procedure. The operations performed by the data processing apparatus may include identifying any invocations of client procedures of the client programming language input in the server programming language input, producing a combined client procedure in the client programming language input for identified client procedures invoked by the server programming language input, and replacing invocations of the identified client procedures in the server programming language input with an invocation of the combined client procedure. In some examples, the operations performed by the data processing apparatus include producing a communication service that marshals information between the executable client and server applications to support the combined client procedure.

In general, another aspect of the subject matter described in this specification can be embodied in a system including a computer-readable medium including instructions and a computing device including one or more processors configured to execute the instructions and perform operations comprising providing a compiler configured for receiving a client programming language input and a server programming language input, processing the client and server programming language inputs, and translating the client programming language input into an executable client application and the server programming language input into an executable server application, the executable client and server applications operable to communicate with each other. Processing the client and server programming language inputs includes identifying any invocations of server procedures of the server programming language input in the client programming language input, producing a combined server procedure in the server programming language input for identified server procedures invoked by the client programming language input, and replacing invocations of the identified server procedures in the client programming language input with an invocation of the combined server procedure.

These and other implementations can optionally include one or more of the following features. In some implementations, the compiler is configured for producing a communication service that marshals information between the executable client and server applications to support the combined server procedure. The compiler may be configured for identifying any invocations of client procedures of the client programming language input in the server programming language input, producing a combined client procedure in the client programming language input for identified client procedures invoked by the server programming language input, and replacing invocations of the identified client procedures in the server programming language input with an invocation of the combined client procedure. In some examples, the compiler is configured for producing a communication service that marshals information between the executable client and server applications to support the combined client procedure.

In general, in one aspect, a computer implemented method includes receiving a client programming language input and a server programming language input. Client symbols of the client programming language input are usable in the server programming language input and server symbols of the server programming language input are usable in the client programming language input. The method includes identifying the usage of any client symbols in the server programming language input and any server symbols in the client programming language input, replacing any client symbols in the server programming language input that represent static client data of the client programming language input with the static client data, and replacing any server symbols in the client programming language input that represent static server data of the server programming language input with the static server data. The method further includes producing one or more communication services to support the usage of any non-replaceable client symbols in the server programming language input and the usage of any non-replaceable server symbols in the client programming language input, and translating the client programming language input into an executable client application and the server programming language input into an executable server application. The executable client and server applications are operable to communicate with each other and each communication service marshals information between the executable client and server applications.

These and other implementations can optionally include one or more of the following features. In some implementations, the method includes combining communication services that each marshal information to a common procedure of one of the executable applications into a combined communication service. The method may include receiving a main programming language input comprising the client programming language input and the server programming language input and parsing the main programming language input to separate the client programming language input from the server programming language input. In some examples, parsing the main programming language input includes identifying metadata indicating inclusion in the server programming language input. Parsing the main programming language input may include identifying a start server portion tag and an end server portion tag, and including any portion of the main programming language input between the start and end server portion tags in the server programming language input.

In some implementations, symbols of the client programming language input and symbols of the server programming language input share a common namespace. Each symbol may be selected from a group consisting of an object, a variable, a method, and a function. In some implementations, the method includes selecting an executable client application type and an executable server application type independent of the programming language inputs. The method may include translating the client programming language input into the respective executable client application portion with a first compiler and translating the server programming language input into the respective executable server application portion with a second compiler. The first and second compilers may be selected based on at least one of the received programming language input, the executable format of the executable application, and a platform for executing the executable client application. The method may include producing a communication module for communication between the executable client and server applications to facilitate the usage of any client symbols and any server symbols there between.

In general, another aspect of the subject matter described in this specification can be embodied in a computer program product, encoded on a computer-readable medium, operable to cause a data processing apparatus to perform operations including receiving a client programming language input and a server programming language input. Client symbols of the client programming language input are usable in the server programming language input and server symbols of the server programming language input are usable in the client programming language input. The operations include identifying the usage of any client symbols in the server programming language input and any server symbols in the client programming language input, replacing any client symbols in the server programming language input that represent static client data of the client programming language input with the static client data, and replacing any server symbols in the client programming language input that represent static server data of the server programming language input with the static server data. The operations also include producing one or more communication services to support the usage of any non-replaceable client symbols in the server programming language input and the usage of any non-replaceable server symbols in the client programming language input, and translating the client programming language input into an executable client application and the server programming language input into an executable server application. The executable client and server applications operable to communicate with each other, and each communication service marshals information between the executable client and server applications.

These and other implementations can optionally include one or more of the following features. In some implementations, the operations performed by the data processing apparatus further include combining communication services that each marshal information to a common procedure of one of the executable applications into a combined communication service. The operations performed by the data processing apparatus may include receiving a main programming language input comprising the client programming language input and the server programming language input and parsing the main programming language input to separate the client programming language input from the server programming language input. In some examples, parsing the main programming language input comprises identifying metadata indicating inclusion in the server programming language input. Parsing the main programming language input may include identifying a start server portion tag and an end server portion tag, and including any portion of the main programming language input between the start and end server portion tags in the server programming language input.

In some implementations, the symbols of the client programming language input and symbols of the server programming language input share a common namespace. Each symbol may be selected from a group consisting of an object, a variable, a method, and a function. The operations performed by the data processing apparatus may include selecting an executable client application type and an executable server application type independent of the programming language inputs. In some examples, the operations performed by the data processing apparatus include translating the client programming language input into the respective executable client application portion with a first compiler and translating the server programming language input into the respective executable server application portion with a second compiler. The first and second compilers may be selected based on at least one of the received programming language input, the executable format of the executable application, and a platform for executing the executable client application. The operations performed by the data processing apparatus may include producing a communication module for communication between the executable client and server applications to facilitate the usage of any client symbols and any server symbols there between.

In general, another aspect of the subject matter described in this specification can be embodied in a system including a computer-readable medium including instructions and a computing device including one or more processors configured to execute the instructions and perform operations comprising providing a compiler configured for receiving a client programming language input and a server programming language input. Client symbols of the client programming language input are usable in the server programming language input and server symbols of the server programming language input are usable in the client programming language input. The compiler is configured for identifying the usage of any client symbols in the server programming language input and any server symbols in the client programming language input, replacing any client symbols in the server programming language input that represent static client data of the client programming language input with the static client data, and replacing any server symbols in the client programming language input that represent static server data of the server programming language input with the static server data. The compiler is configured for producing one or more communication services to support the usage of any non-replaceable client symbols in the server programming language input and the usage of any non-replaceable server symbols in the client programming language input, and translating the client programming language input into an executable client application and the server programming language input into an executable server application. The executable client and server applications operable to communicate with each other. Each communication service marshals information between the executable client and server applications.

These and other implementations can optionally include one or more of the following features. In some implementations, the compiler combines communication services that each marshal information to a common procedure of one of the executable applications into a combined communication service. In some implementations, the compiler receives a main programming language input comprising the client programming language input and the server programming language input and parses the main programming language input to separate the client programming language input from the server programming language input. In some examples, parsing the main programming language input includes identifying metadata indicating inclusion in the server programming language input. Parsing the main programming language input may include identifying a start server portion tag and an end server portion tag, and including any portion of the main programming language input between the start and end server portion tags in the server programming language input.

In some implementations, the symbols of the client programming language input and symbols of the server programming language input share a common namespace. Each symbol may be selected from a group consisting of an object, a variable, a method, and a function. In some examples, the compiler selects an executable client application type and an executable server application type independent of the programming language inputs. The compiler may translate the client programming language input into the respective executable client application portion with a first compiler and translate the server programming language input into the respective executable server application portion with a second compiler. The compiler may select the first and second compilers based on at least one of the received programming language input, the executable format of the executable application, and a platform for executing the executable client application. In some examples, the compiler produces a communication module for communication between the executable client and server applications to facilitate the usage of any client symbols and any server symbols there between.

Particular embodiments of the subject matter described in this specification can be implemented to realize one or more of the following advantages. The present disclosure provides a technique for developing an application under a single framework (e.g., single code base), such that a compiler and/or virtual machine produces the client and server portions of the application, thereby allowing a user (e.g., software developer) to develop the application as a single application (e.g., within an IDE) without managing separate client and server applications and the communications there between. Replacing any client symbols in the server programming language input that represent static client data of the client programming language input with the static client data, and replacing any server symbols in the client programming language input that represent static server data of the server programming language input with the static server data reduces the number of communication service calls between the executable client and server applications, thus increasing the efficiency of those applications. Likewise, combining communication services that each marshal information to a common procedure of one of the executable applications into a combined communication service as increases the efficiency of the executable client and server applications by reducing the number of communication service calls between the two applications. Other advantages include freeing the software developer from having to worry about client capabilities since different versions of the client code can be compiled for devices with different specifications and capabilities.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 4-7C are schematic views of example applications including client and server applications with seamless use of client-side and server-side symbols therein.

Like reference symbols in the various drawings indicate like elements.

DETAILED DESCRIPTION

Figure 1:
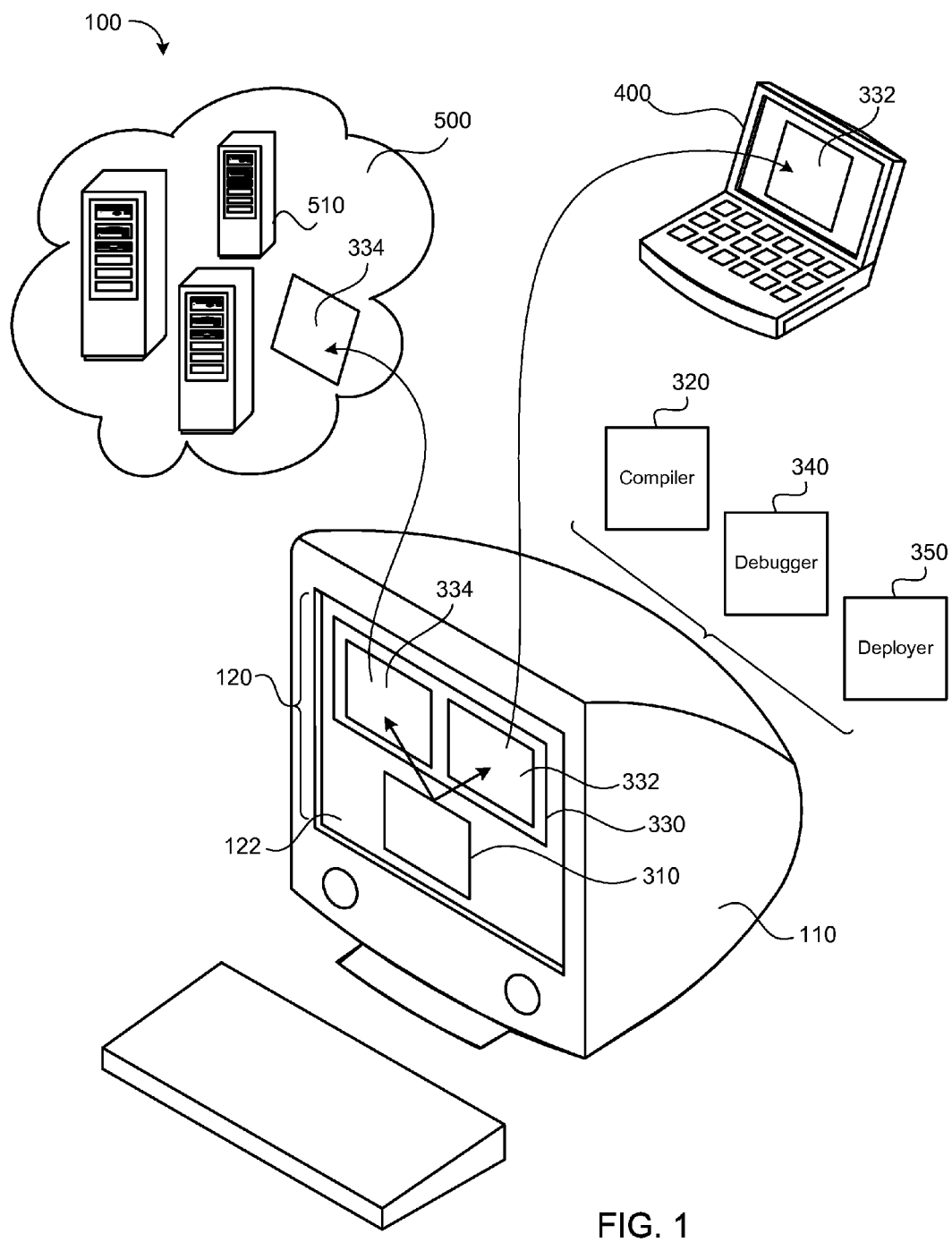
FIG. 1 is a schematic view of an example computer for software development.
Figure 3:
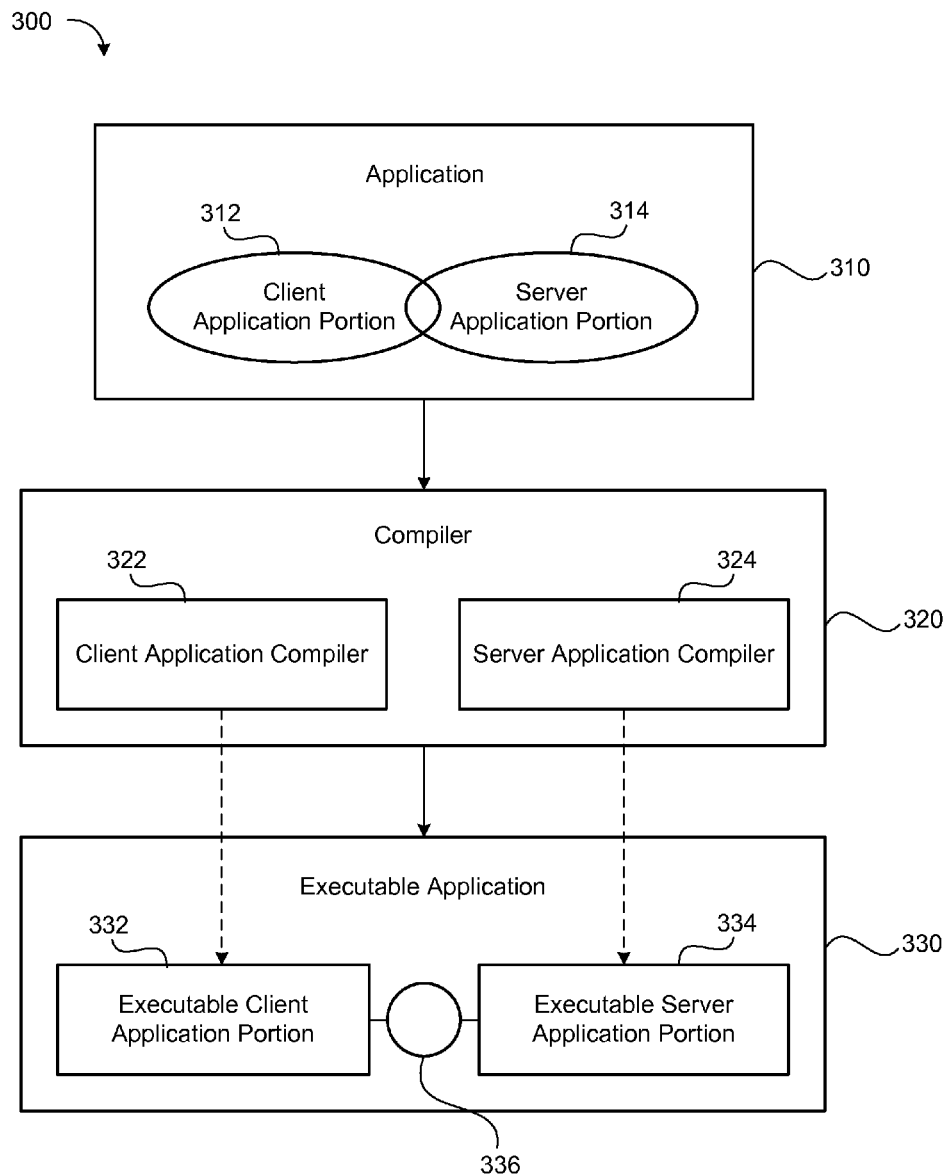
FIG. 3 is a schematic view of a unified programming model for cloud computing.

FIG. 1 illustrates, in general, a software development paradigm 100 or technique that allows a user (e.g., software developer) to write and maintain a single code base in a single context for an application 310 in an integrated development environment (IDE) 120, executable on a computer 110, for deployment to a cloud computing service 500 and optionally a client computing device 400. In various implementations, the application 310 is translated into an executable application 330 having an executable client application 332 and an executable server application 334 without requiring intervention by the user. The executable client and server applications 332, 334 may each be compiled or interpreted, and may be separate applications that communicate with each other (e.g., via a web service). The executable application 330 may, in some instances, be the combined result of the interactions between the client and server executable applications 332, 334. For example, the executable client application 332 may provide a graphical user interface (GUI), while the executable server application 334 may provide database interactions, and together the executable client and server applications 334 provide the executable application 330. FIG. 1 shows a schematic representation of the application 310, in a graphical user interface (GUI) 122 of the IDE 120, being translated 25 into an executable application 330 having the executable client and server application portions 332, 334. The application developer writes client and server application portions 312, 314 of the application 310 and the interactions therebetween (e.g., invocations) in a single context (e.g., single language) to create the application 310. The single context of the application means that the developer can use client and server symbols interchangeably between the client and server application portions 312, 314 (e.g., shared symbol namespace) in a single programming language, for example, versus writing and maintaining separate client and server code portions of the application 310 in different languages and different programming contexts and providing explicit communications therebetween (e.g., asynchronous remote procedure, service or method invocation) (FIG. 3). In some implementations, the application 310 is written in one programming language (e.g., Action Script, C++, Java, ECMAScript, or MXML), using one or more frameworks, while, in other implementations, the application 310 may be written one or more programming languages. A software framework is an abstraction in which common code providing generic functionality can be selectively overridden or specialized by user code providing specific functionality, for example. Frameworks are similar to software libraries in that they are reusable abstractions of code wrapped in a well-defined application programming interface (API). Unlike libraries, however, the overall program's flow of control is not dictated by the caller, but by the framework. This inversion of control is the distinguishing feature of software frameworks.

The software development paradigm includes a compiling stage, a debugging stage, and a deploying stage. In the compiling stage, a compiler 320 (e.g., a process or program(s) that transforms source code into an executable form, such as a compiler or interpreter), executable on the computer 110 or another computer, compiles or translates the application 310 into client and server applications 332, 334, which together form the executable application 330. In the debugging stage, the user uses a debugger 340, executable on the computer 110 or another computer (e.g., a computing device 510 in a cloud computer service 500), for debugging the code (e.g., to find and correct errors) so that the executable application 330 runs or functions substantially without errors. In the deploying stage, the user utilizes a deployer 350, executable on the computer 110 or another computer, for deploying the executable application 310 to a deployment space. For example, the client application 332 may be deployed to the client device 400 (e.g., portable computing device) and the executable server application 334 may be deployed to the cloud computing service 500 where the executable server application 334 executes on a server computing device 510, for example. The IDE 120 receives a deployment request from a user, and in response to the deployment request, executes deployment of the executable application 330 via the deployer 350. The user may click a button (e.g., as a single user event) in the graphical user interface 122 of the IDE 120 to send the deployment request. The IDE 120 recognizes receipt of the deployment request and calls the deployer 350 to carry out deployment of the executable application 330.

Figure 2A:
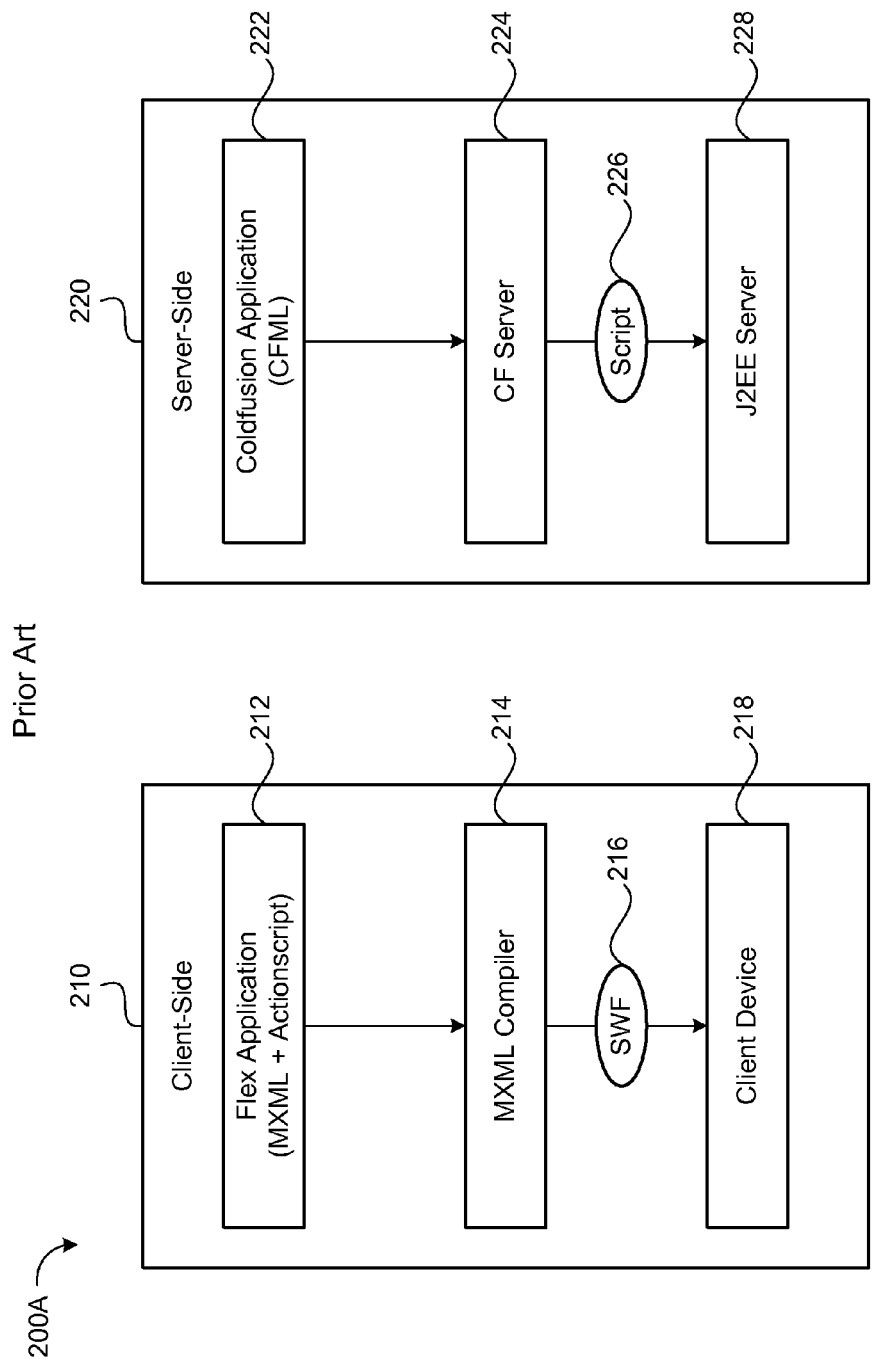
FIG. 2A is a schematic view of a cloud application development process.

FIG. 2A illustrates a typical cloud application development process 200A that includes a client side development process 210 and server sided development process 220 that entails writing code in different languages (e.g., in different contexts), which generally requires different tooling, language expertise and capital investment. The client-side development process 210 entails writing client-side code 212, such as a Flex Application in MXML and Actionscript, compiling the client-side code 212 with a compiler 214, such as an MXML compiler, into an executable client-side application 216, such as SWF file, executable on a client computing device 218. The server-side development process 220 entails writing server-side code 222, such as a Coldfusion Application in Coldfusion Markup Language (CFML) and Actionscript, compiling the server-side code 222 with a compiler 224, such as a Coldfusion server, into an executable server-side application 226 executable on a server computing device 228.

Figure 2B:
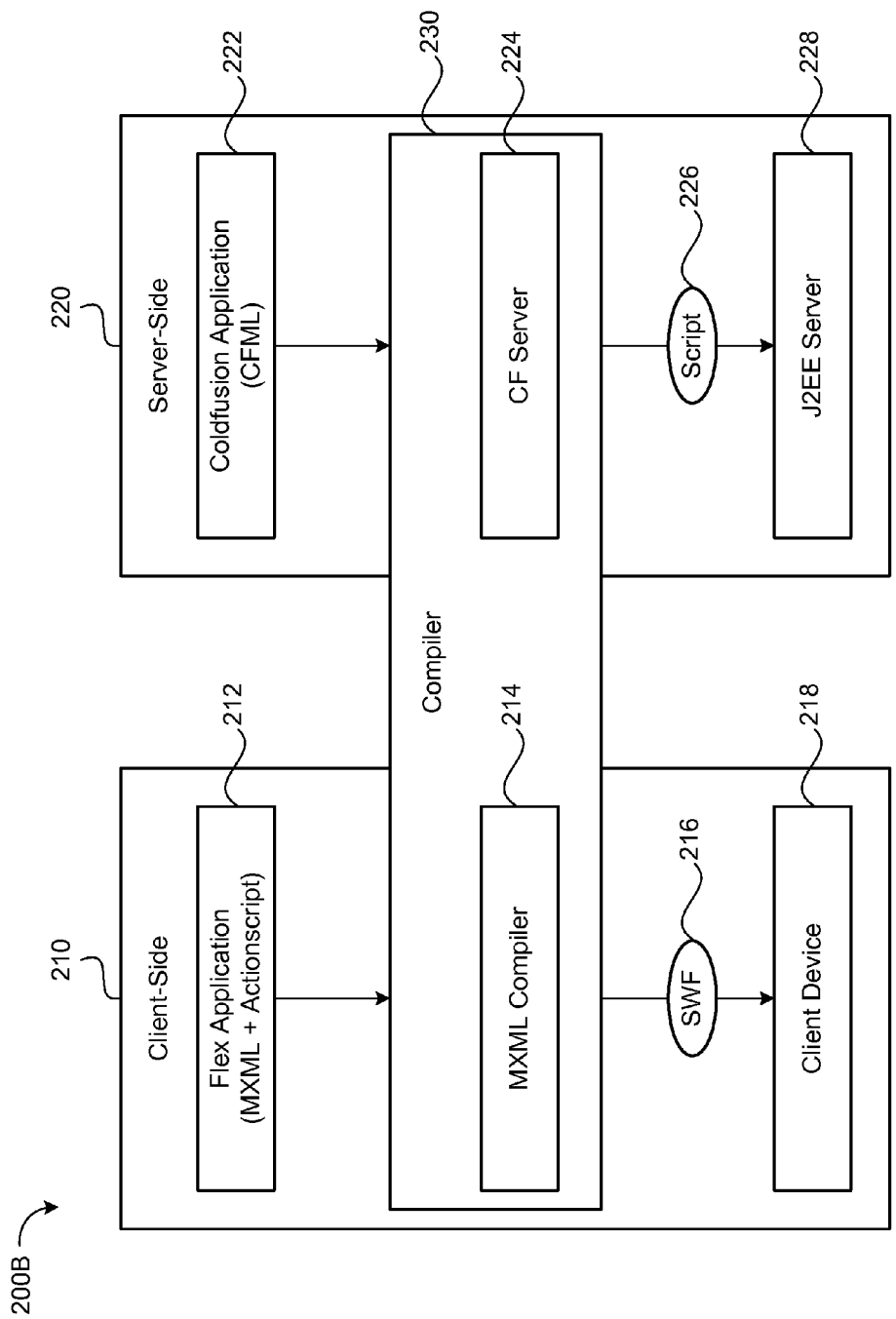
FIG. 2B is a schematic view of a programming model for cloud computing.

Referring to FIG. 2B, a homogeneous programming model 200B for cloud computing may include a client-side development process 210 and server-side development process 220 that entails writing code in the same or different languages (e.g., in the same or different contexts). The client-side development process 210 entails writing client-side code 212, such as a Flex Application in MXML and Actionscript, and the server-side development process 220 entails writing server-side code 222, such as a Coldfusion Application in Coldfusion Markup Language (CFML). A compiler 230 (e.g., preprocessor) receives the client-side code 212 and the server-side code 222 for processing (e.g., for optimization and compilation or translation). The compiler 230 is configured to receive an input (e.g., the client-side code 212 and the server-side code 222, respectively, from the IDE 120) and compile or translate the input into an executable client-side application 216, such as SWF file, executable on a client computing device 218 and an executable server-side application 226 executable on a server computing device 228. In some implementations, the compiler 230 includes one or more client compilers 214 and one or more server compilers 224 that may receive the client-side code 212 and the server-side code 222, respectively, and compile or translate them into the executable client-side application 216, and the executable server-side application 226, respectively. Each compiler 214, 224 may be a computer program (or set of programs) that translates text or symbols written in a computer programming language into another a target language, for example, to create a executable application or program. In some instances, the client and server compilers 214, 224 are specified in default settings (e.g., by a user configuration). In other instances, the user specifies the specific compiler 214, 224 in source code metadata, such as scripting tags.

Traditionally, compilers optimize the code of a given application, and the scope of optimization is the scope of the application. Thus, the client-side code 212 (e.g., written in Flex) and the server-side code 222 (e.g., written in Java) are compiled and optimized independently with no coordination and by two separate compilers that do not share any context. In the homogeneous programming model 200B, the compiler 230 detects any points in the client-side code 212 and the server-side code 222 that require communication between the executable client-side application 216 executing on the client computing device 218 and the executable server-side application 226 executing on the server computing device 228 and minimizes this communication by looking at the client-side code 212 and the server-side code 222 as a single application or system, rather than two independent applications, and combining distinct communications where possible. Although writing the client-side code 212 and the server-side code 222 in same language offers several benefits, such as productivity, it is not necessary to take advantage of the compiler optimizing process.

Figure 2C:
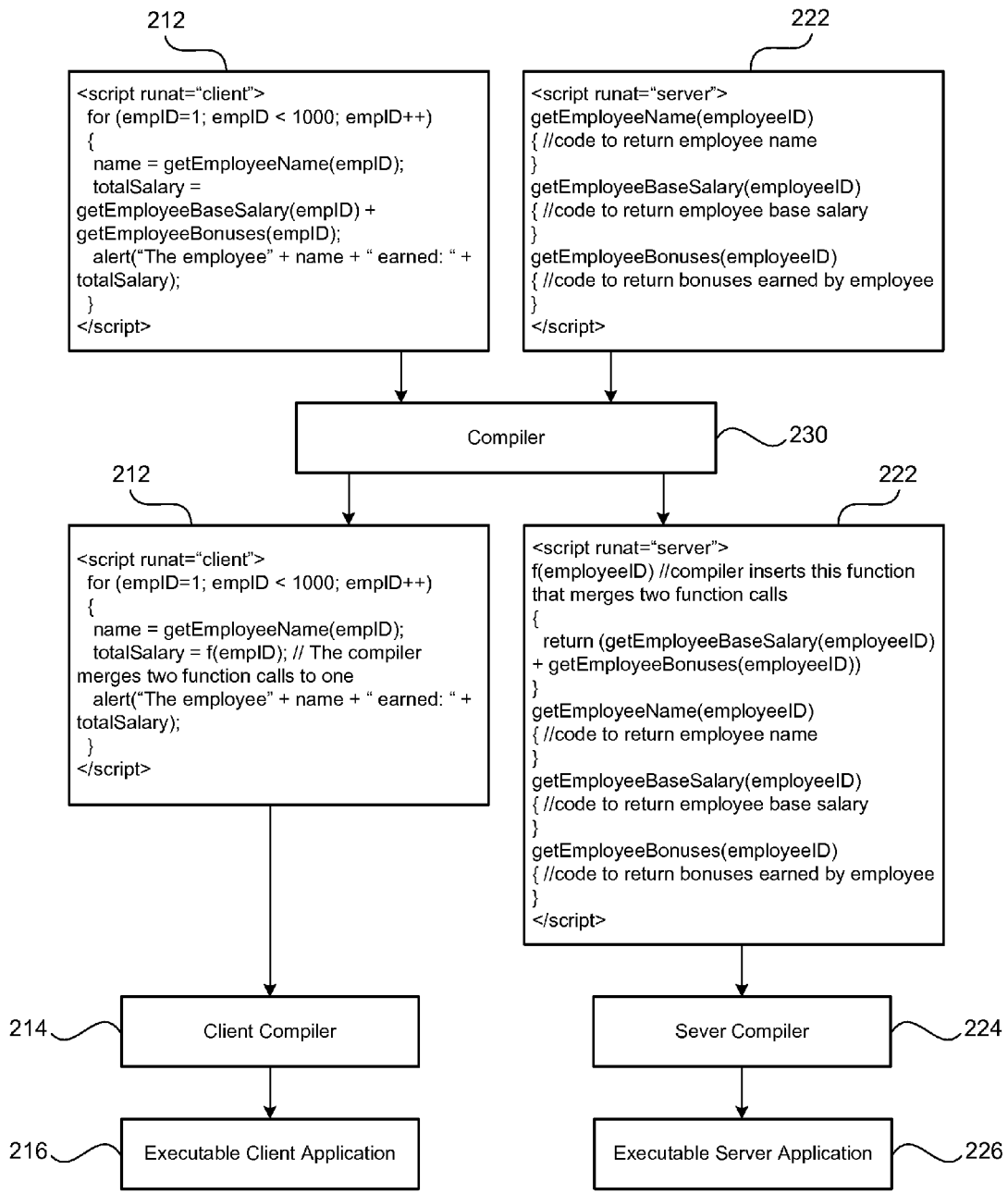
FIG. 2C-2F is a schematic view of an optimization process for client-side and server-side programming.

The example in FIG. 2C illustrates function optimization processing of the client-side code 212 and the server-side code 222 received by the compiler 230. The client-side code 212 includes a "for" loop which iterates through a set of employee IDs (empID) to generate a list of employee names and respective salaries. Inside the "for" loop, the variable totalSalary is assigned the summation of the employee base salary and bonuses, provided by respective server functions (i.e., totalSalary=getEmployeeBaseSalary(empID)+getEmployeeBonuses(empID);). Without optimization, compilation of the client-side code 212 will result in an executable client-side application 216 that individually communicates with the respective executable server-side application 226 for invocation of each server-side function (e.g., getEmployeeBaseSalary(empID) and getEmployeeBonuses(empID)). With optimization, the compiler 230 identifies that two or more server-side functions are invoked in the same statement (e.g., source code statement, procedure, class, object, function, method, etc.) and replaces the multiple invocations with a single communication between the executable client-side application 216 and the executable server-side application 226. In the example shown, the compiler 230 creates a server-side function "f(employeeID)" that combines getEmployeeBaseSalary(employeeID) and getEmployeeBonuses(employeeID). The compiler 230 replaces the client-side invocation of getEmployeeBaseSalary(empID) and getEmployeeBonuses(empID) with f(empID) in client-side code 212, thereby reducing multiple client-server communications to a single communication. The optimized client-side code 212 and server-side code 222 are received by their respective client and server compilers 214, 224 for compilation or translation into the respective executable client-side and server-side applications 216, 226. The compiler 230 may include instructions, algorithms, and/or logic routines for discerning which communications to combine, how to create combined function, how to order sub-functions within a combined function, and testing of combined functions.

Figure 2D:
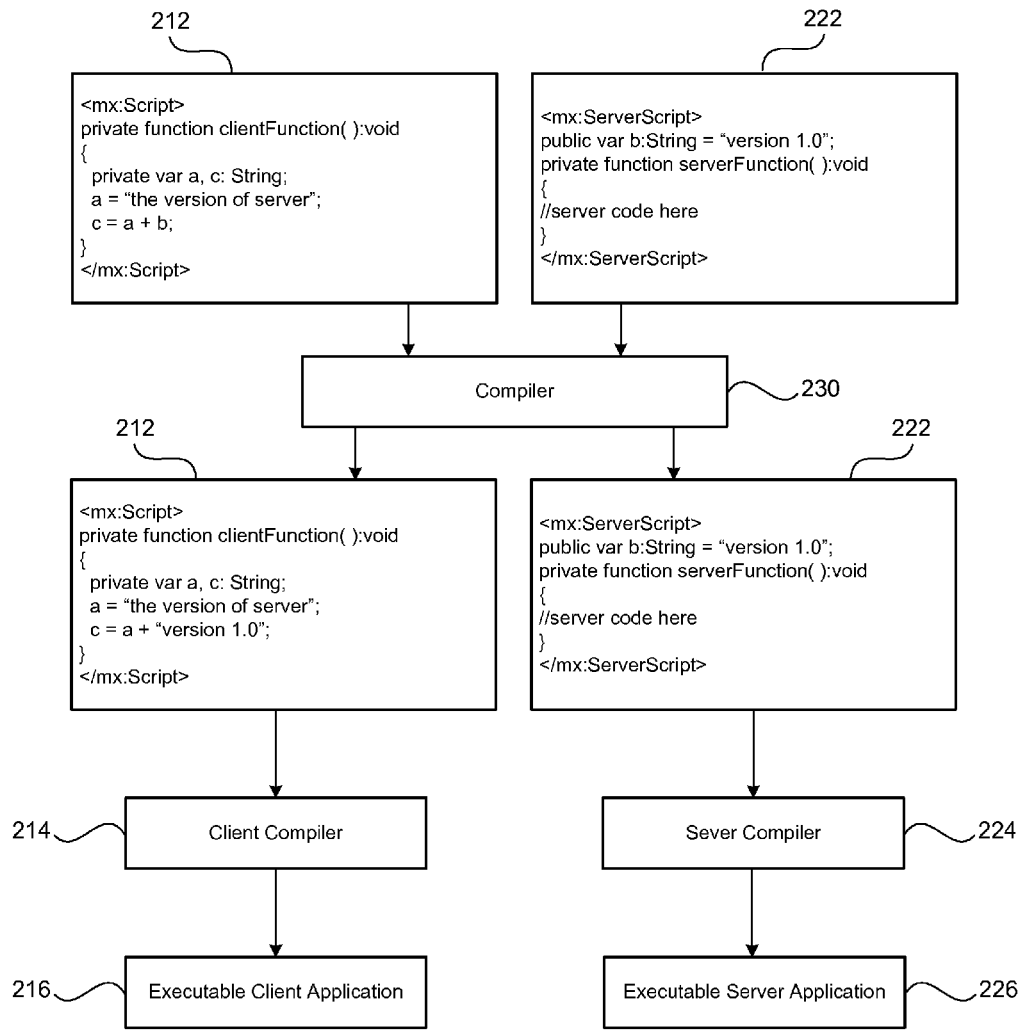

The example in FIG. 2D illustrates constant folding optimization processing of the client-side code 212 and the server-side code 222 by the compiler. The client-side code 212 includes usage of a server variable b, which is a defined as a constant in the server-side code 222. The compiler 230 identifies the usage of the server variable b in the client-side code 212 as well as the fact that the server variable b is defined as a constant in the server-side code 222. The compiler 230 replaces the reference to the server variable b in the client-side code 212 with a string constant (e.g., "version 1.0") corresponding to the value defined in the server-side code 222, thus avoiding a web service transaction between the executable client-side and server-side applications 216, 226. Similarly, the compiler 230 may also identify the usage of client variables, defined as constants in the client-side code 212, in the server-side code 222 and replace the reference to the client variable with a corresponding constant value.

Figure 2E:
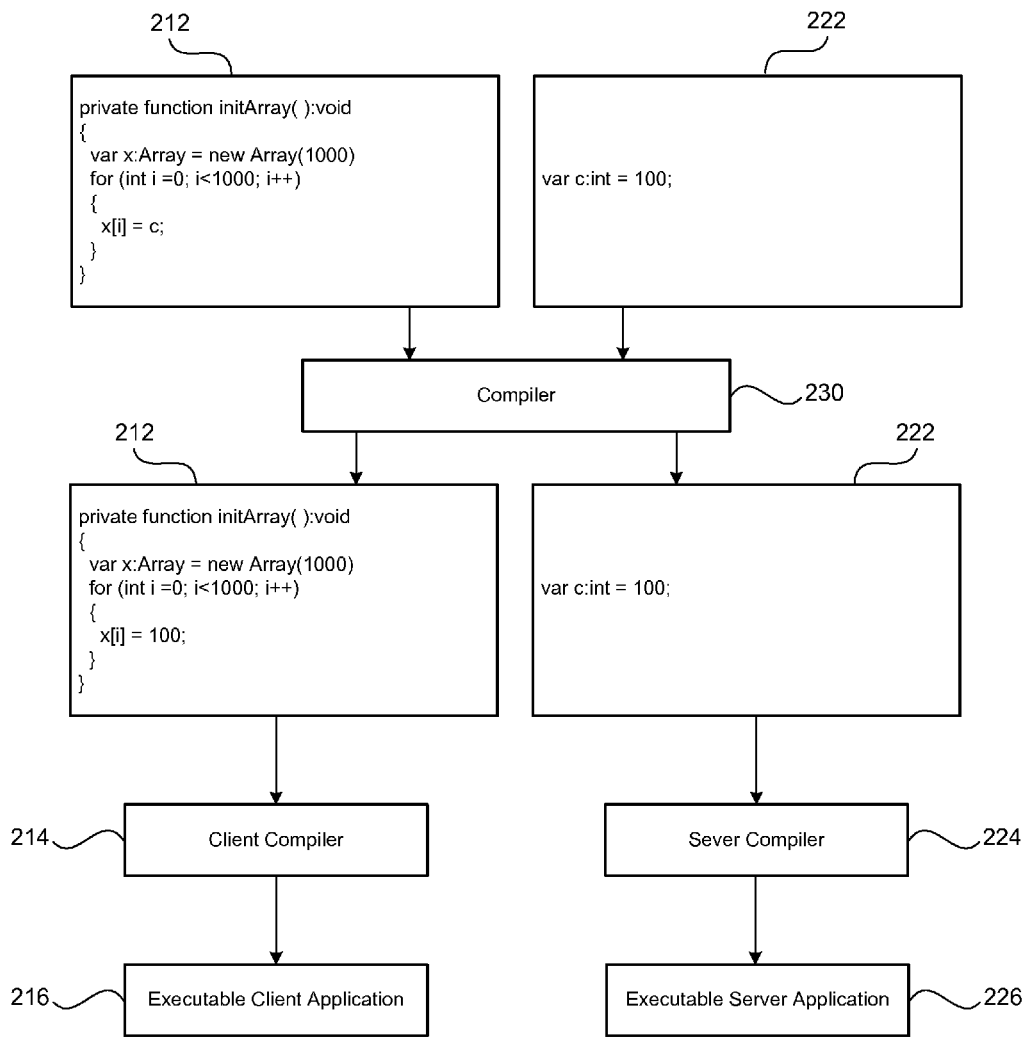

The example in FIG. 2E illustrates loop optimization processing of the client-side code 212 and the server-side code 222 by the compiler. The client-side code 212 includes a "for" loop which iteratively loads an array x[i] with the value of a server variable c defined in the server-side code 222. Without optimization processing, the server variable c will be retrieved through a web service 1000 times for each iteration of the loop; however, with the optimization processing it will be read just once. The compiler 230 identifies the usage of the server variable c in the client-side code 212 as well as the fact that the server variable c is defined as a constant. The compiler 230 replaces the reference to the server variable c in the client-side code 212 with the value of the constant (i.e., 100) defined in the server-side code 222, thus avoiding multiple web service transactions between the executable client-side and server-side applications 216, 226. In some examples, the compiler 230 performs constant folding optimization processing of an expression in the client-side and/or server-side code 212, 222 to determine that a symbol refers to a constant. The compiler 230 then replaces the identified expression with the referenced constant(s) or equated expression as a constant.

Figure 2F:
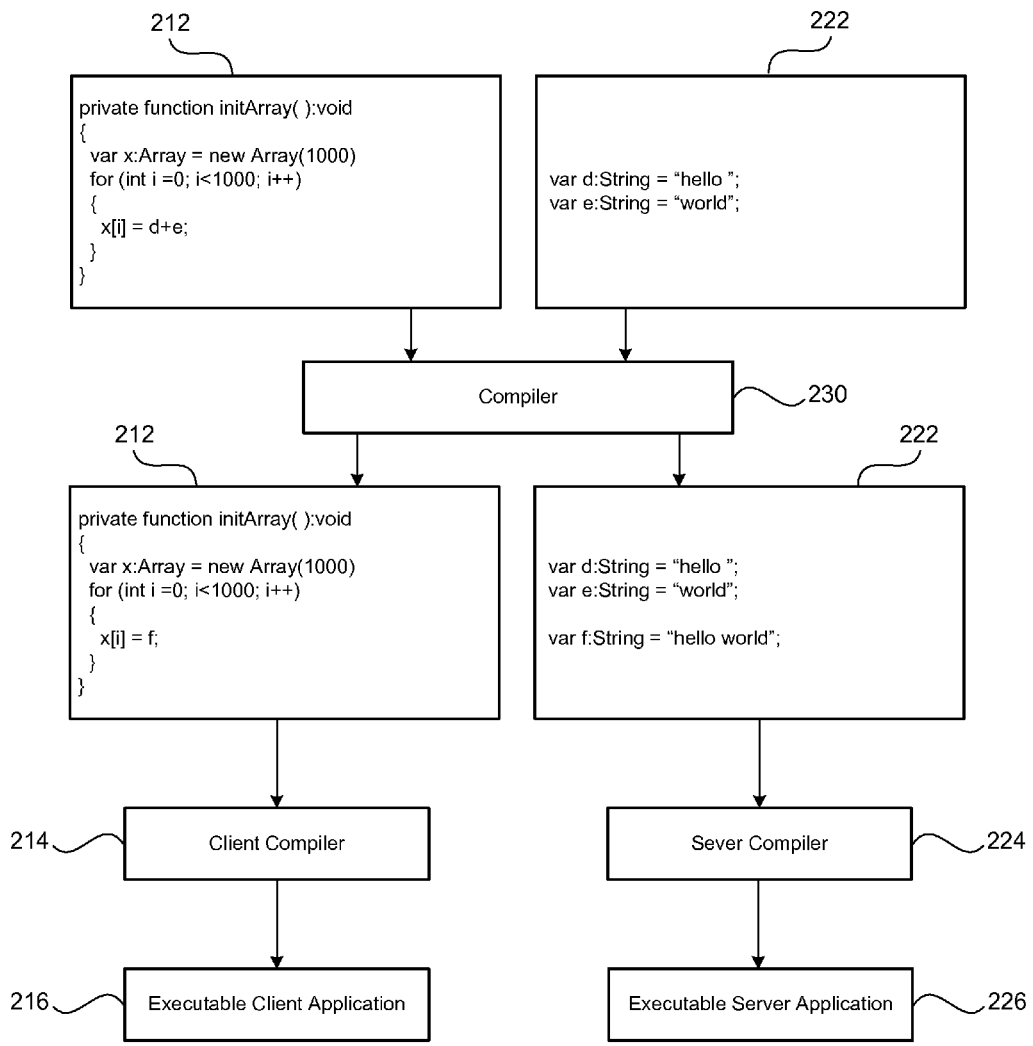

The example in FIG. 2F illustrates additional loop optimization processing of the client-side code 212 and the server-side code 222 by the compiler. The client-side code 212 includes a "for" loop which iteratively loads an array x[i] with the concatenation of server variable d and server variable e, both defined in the server-side code 222. Without optimization processing, the executable client-side application 216 will have to make two web service transactions with the executable server-side application 226 to individually retrieve the values of server variables d and e for each iteration of the loop. In contrast, with the optimization processing, the compiler 230 identifies the usage of the server variables d and e in the client-side code 212 and the multiple web service transactions. The compiler 230 produces a combined server symbol f (e.g., variable, function, method, etc.) in the server-side code 222 that combines (e.g., concatenates) the two server variables d and e, and replaces the references to the server variables d and e in the client-side code 212 with the combined server symbol f, thus avoiding multiple web service transactions between the executable client-side and server-side applications 216, 226. Similarly, the compiler 230 may also identify the usage of multiple client variables, defined in the client-side code 212, in the server-side code 222 and replace the references to the identified client variables with a combined client symbol that provides the information and/or functionality of each of the identified client variables.

Referring to FIG. 3, a unified programming model 300 for cloud computing allows a user to write and maintain an application 310 in a single language (although multiple languages may be used in some implementations) that has both client and server portions 312, 314. The application 310 can be written in a single context (e.g., shared symbol namespace), where client symbols such as variables, objects, methods, functions of the client application portion 312 are available to the server application portion 314 and vice versa. While writing the application 310, the application developer may use server symbols in the client application portion 312 and client symbols in the server application portion and the compiler 320, upon processing the application 310, provides the communication between the two application portions 312, 314 and separates them into respective client and server executable applications 332, 334. The seamless use of client and server symbols (e.g., variables, objects, methods, functions, etc.) within a single language allows an application developer to create client and server side code as a single code base. For example, the application developer may write a program in a single language that provides a graphical user interface (GUI) that displays data retrieved from a database, where the client-side code for the GUI is seamless or coextensive with the server-side code for the database interactions. In a mixed language environment, where one programming language is used for the client application portion 312 and another language is used for the server application portion 314, for example, there is a shared namespace (e.g., shared nomenclature for objects, variables, methods, functions, and so on shared between the two application portions 312, 314).

The compiler 320 is configured to receive input (e.g., the application 310 from the IDE 120) and compile or translate the input into an executable client application 332 and an executable server application 334, which together form an executable application 330. The compiler 320 may be a computer program (or set of programs) that translates text or symbols written in a computer programming language into another a target language, for example, to create a executable application or program 330, 332, 334. The application 310 comprises source code (e.g., a high-level programming language), which is translated into executable code (e.g., object code, intermediate code, or a lower level language, such as assembly language or machine language) of the executable application 330. The compiler 320 parses the application 310 into the client and server portions 312, 314, resolves any communications between the client and server application portions, and produces any necessary server side scripts to support the client-server communications. For example, the application developer may write a program in a single language that provides a graphical user interface (GUI) that displays and allows manipulation of data retrieved from a database, without creating a separate code base for the database interactions.

In some implementations, the compiler 320 divides the application 310 into the client application portion 312 and the server application portion 314 based on metadata (e.g., source code tags) in the application 310. A configuration object, file, or parameter may be passed to the compiler 320 to identify parsing tags, objects, and so on, for parsing the application source code 310 and/or library paths for compilation and/or output paths. The compiler 320 resolves the usage of client and server symbols (e.g., variables, objects, methods, functions, etc.) between the two application portions 312, 314 by identifying the connections between the separated client and server application portions 312, 314 and producing any necessary support for communications between the separate executable client and server applications 332, 334. For example, the client and server symbols may be replaced with web service calls in the executable client and server applications 332, 334. During development of the application 310, the user may select specific local and remote classes of a single programming language designated for respective use in the executable client and server applications 332, 334. During compilation of the application 310, the compiler 320 recognizes the local and remote classes and translates the source code into the respective executable applications 332, 334.

The compiler 320 may be configured to provide a communication module 336 for communication (e.g., asynchronous communication) between the executable client application 332 and the executable server application 334. The communication module 336 may provide an application programming interface (API) as a web service for communications between the executable client an server applications 332, 334. The user may specify a communication protocol (e.g., Action Message Format (AMF), Simple Object Access Protocol (SOAP), JavaScript Object Notation (JSON), etc.) for communications between the executable client and server applications 332, 334. The user may also stipulate in the source code metadata a type of encryption and/or authentication between the executable client and server applications 332, 334.

In some implementations, the compiler 320 partitions the application 310 into the client and server application portion 312, 314, resolves the usage of the client and server symbols, as used in a single context, and translates or compiles the client application portion 312 into the executable client application 332 with a client application compiler 322 and the server application portion 314 into the executable server application 334 with a client application compiler 324. The compiler 320 may choose the client and server application compilers 322, 324 based on the language of the application 310 and/or a desired output format of the executable client and server applications 332, 334. For example, upon receiving an application 310 written in MXML and Actionscript (AS), the compiler 320 may choose to compile the client application portion 312 on an MXML/AS compiler/linker 322, which includes Flash/Flex client-side libraries, to produce a SWF file as the executable client application 332 (to be executed by a Flash client). The compiler may choose to compile the server application portion 314 on a client application compiler 324 that provides a user-specified output, such as server-side script (e.g., for a CFML or Ruby application), server-side byte code (e.g., for implementation as a Java class), or a server-side SWF file (e.g., for implementation as a Flash application). A project type in the IDE 120 may also be used to designate the type of client and/or server application compilers 322, 324 to use for compilation of the application 310.

In some implementations, the compiler 320 translates the application 310 into a executable application 330, which is divided or segmented into the executable client application 332 and the executable server application 334 at run-time, for example, by a virtual machine (VM), a native code client computing device, and/or a native code server computing device. In some examples, the user attributes metadata (e.g., a "dynamic" metadata type) to the source code of the application 310 indicating that the executable client and server applications 332, 334 will be produced at run-time from the executable application 330. The same criteria for apportioning the client and server application portions 312, 314 described with respect to the compiler 320 may be used by the virtual machine.

The compiler 320 may be configured to perform one or more of the following operations: lexical analysis, preprocessing, parsing, semantic analysis, code generation, and code optimization. The output produced by the compiler 320 may be executable on a virtual machine that may or may not reside on the same platform as the compiler 320.

Generally, the executable code has a form suitable for processing by other programs (e.g., a linker) or a virtual machine, but may be a human-readable text file.

The application developer may write the source code of the application 310 in a single language context, such that the developer can use client-side and server-side variables interchangeably. The client-side application portion 312 may invoke a server function or reference a server variable, and the server-side application portion 314 can invoke a client function and access a client variable. For example, the client-side application portion 312 can define, use, and bind to a server-side variable. As a result, the client-side application portion 312 can write to (e.g., define) and read from (e.g., use) a server-side variable as well as receive automatic updates of changes on the server (e.g., binding). Likewise, the server-side application portion 314 can define, use, and bind to a client-side variable. As a result, the server-side application portion 314 can write to (e.g., define) and read from (e.g., use) a client-side variable as well as receive automatic updates of changes on the client (e.g., binding). The interchangeable use of variables between the client and server application portions 312, 314 includes all possible invocations between the two. For example, the client application portion 312 may make a local function call that takes a server-side class as an input parameter (e.g., doSomethingInClient(serverMath c)).

Referring to FIG. 4, in the example shown, the function "doSomethingInClient", written in Actionscript, runs in the client application portion 312 and takes an object "c" which is of the class "serverMath." The class serverMath is declared in the server application portion 314 and invokes a method "add" in this object. This is an example of seamless integration of client and server contexts (e.g., interchangeable usage of client and server symbols in each application portion 312, 314). In the executable client and server applications 332, 334, the interchangeably used symbols may be replaced with web service calls. For example, in the executable client application 332, the invocation of the "add" method of the server-Math class can be replaced with a web service call (e.g., application programming interface (API)) to the executable server application 334, which includes the necessary support to respond to such a call.

In some instances, a user of the executable application 330 needs to be authenticated on the server computing device 410. The executable application 330 displays a username text input box and a password text input box for receiving the user's username and password, respectively. The received username and password are passed to the server computing device 410 for authentication and depending on the result a suitable message is displayed.

In the example shown in FIG. 5A, the user authentication scenario is implemented in the client application portion 312 by invoking a server-side function "authenticate" of the server application portion 314 transparently in the client-side code. The code examples are written in MXML and Actionscript. The source code delineates the client application portion 312 from the server application portion 314 by the use of tags. In the example shown, code of the server application portion 314 is held between the start tag "<mx:ServerScript>" and end tag "</mx:ServerScript>". When processing the source code of the application 310, the compiler 320 identifies the ServerScript tags and parses out the server application portion 314. In this example, the client application portion 312 defines the username text input box (e.g., <mx:TextInput id="un" />) and the password text input box (e.g., <mx:TextInput id="pw" />) and invokes the server-side function "authenticate" of the server application portion 314 (e.g., authenticate(un.text, pw.text)) by passing in the input received in the username text input box and the password text input box. Upon compilation, the compiler 320 resolves the invocation of the server-side function "authenticate" in the client application portion 312. This example demonstrates the seamless use of server application defined methods in the client application portion 312. The server application portion 314 may contain a library of frequency used methods or symbols (e.g., authenticate, email, database query, etc.). In examples that require user authentication by querying a database, the server application portion 314 may include a "dbQuery" class that receives parameters or objects and handles interacting with a database. For example, the developer may call a method of an instantiated object of the dbQuery class to return a result set, where the dbQuery object creates and executes any necessary queries against a designated database.

Figure 5B:
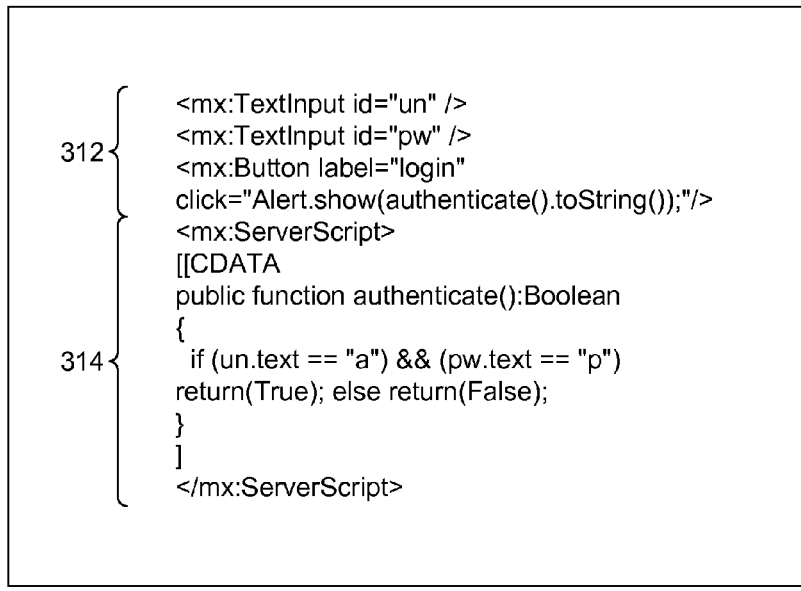

In the example shown in FIG. 5B, the user authentication scenario is implemented by defining the username text input box (e.g., <mx:TextInput id="un" />) and the password text input box (e.g., <mx:TextInput id="pw" />) in the client application portion 312 and invoking the server-side function "authenticate" of the server application portion 314; however, instead of passing in parameters to the server-side function, the server application portion 314 uses the inputs of the username and password text input boxes directly. This example demonstrates the seamless of client application defined variables in the server application portion 314.

Figure 6:
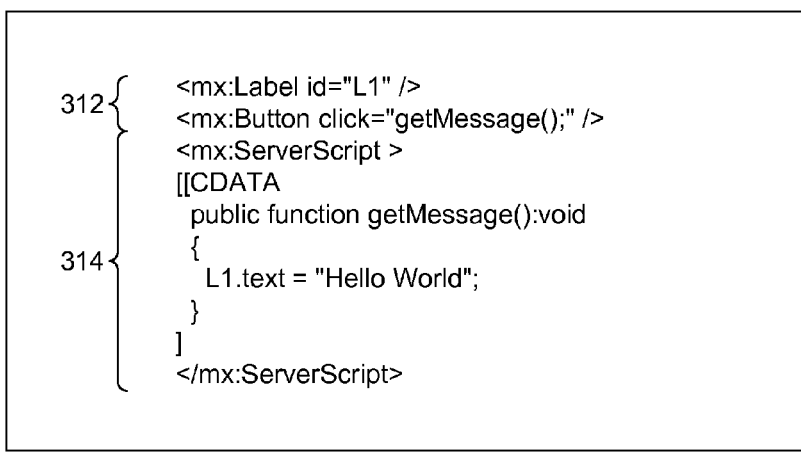

FIG. 6 provides a "Hello World" example where a text label L1 defined in the client application portion 312 is accessed by the server application portion 314 to load text into that label. When a user clicks the button (of the executable application 330) the event is automatically handled to call a "getMessage( )" function of the server application portion 314. The "getMessage( )" function receives a message from a server computing device 410 and displays the message as the Label text, directly manipulating the Label control. In this example, the server-side code in the server application portion 314 is server side Actionscript code.

While processing the application 310, the compiler 320 identifies the usage of client symbols of the client application portion 312 in the server application portion 314 and the usage of server symbols of the server application portion 314 in the client application portion 312. In some examples, the compiler 320 may substitute web service calls (or messaging) for each symbol to facilitate communications between the produced executable client and server applications 332, 334. However, to optimize or increase the efficiency of the executable applications 330, 332, 334, the compiler 320 may reduce the number of web service calls by analyzing the usage of client and server symbols between the client and server application portions 312, 314 and determining whether web service calls can be combined or eliminated. In the example shown in FIG. 7A, the client application portion 312 uses a server symbol, variable b, that is defined as a constant in the server application portion 314. Without optimization, the compiler 320 can provide communication (e.g., a web service call) between the executable server application 334 and the executable client application 332 to allow the deliverance/retrieval of the value of server variable b. With constant folding optimization, the compiler 320 identifies that the server symbol, variable b, used in the client application portion 312 is a constant (e.g., static server data) defined on the server and reference to the variable b in the client application portion 312 is replaced by a string constant thus avoiding a web service transaction between the executable client and server applications 332, 334. Similarly, if the compiler 320 identifies that a client symbol used in the server application portion 314 is a constant (e.g., static client data) defined on the client, reference to the client symbol in the server application portion 314 is replaced by a string constant thus avoiding a web service transaction between the executable client and server applications 332, 334. Furthermore, the compiler 320 may perform constant folding processing of an expression to determine that a symbol refers to a constant. The compiler 320 then replaces the identified expression with the referenced constant(s) or equated expression as a constant.

Referring to the example shown in FIG. 7B, the client application portion 312 iterates through a "for" loop to load an array "x" with the value of a server variable "a." Without optimization, the server variable "a" will be retrieved through a web service 1000 times for each iteration of the loop in the executable client application 332. However, with the compiler optimization, while processing the application 310, the compiler 320 parses the application 310 into separate client and server portions 312, 314 and resolves the usage of client and server symbols there between by recognizing the usage of the server symbol, variable "a", in the "for" loop of the client application portion 312 and determining that the server variable is defined as a constant in the server application portion 314. Rather than implementing a communication routine, such a web service call, for retrieval by the executable client application 322 of the server variable from the executable server application 344, the compiler 320 substitutes the value of the server variable for variable "a" in the client application portion 312 before compilation or translation. In instances where separate client and server compilers 322, 324 are used to compile the client and server application portions 312, 314, the substitution may be made before deliverance to or receipt by the client and server compilers 322, 324.

Figure 7C:

In the "Hello World" example of FIG. 7C, the client application portion 312 defines two text labels L1 and L2 that each call a server function of the server application portion 314 to load text into each label. Text label L1 invokes the "getHelloMessage( )" function and text label L2 invokes the getWorldMessage( ) function of the server application portion 314. The two server functions each return a message (i.e., "hello" or "world", respectively) from a server computing device 410 that is displayed as the Label text of L1 and L2, respectively. Without the optimization process, the compiler 320 (or in some instances, the client and server compilers 322, 324 as sub-compilers) translates the client and server application portions 312, 314 into respective executable client and server applications 332, 334 with the two server functions being invoked in the executable client application 332 through two different web service calls to the executable server applications 334. With the optimization process, the compiler 320 resolves the invocation of the server functions in the client application portion 312 by recognizing the usage of the two server functions and determining that the two server functions can be executed in a single call to the server application portion 314. Rather than implementing two separate communication routines, such as web service calls, between the executable client and server applications 322, 324, the compiler 320 combines invocation of the two server functions ("getHelloMessage( )" and getWorldMessage( )") into a single communication (e.g., web service call) between the executable client and server applications 332, 334. In a similar fashion, the compiler 320 may combine other communications between the executable client and server applications 332, 334 for marshalling data or invoking other client symbols or server symbols.

Figure 8:
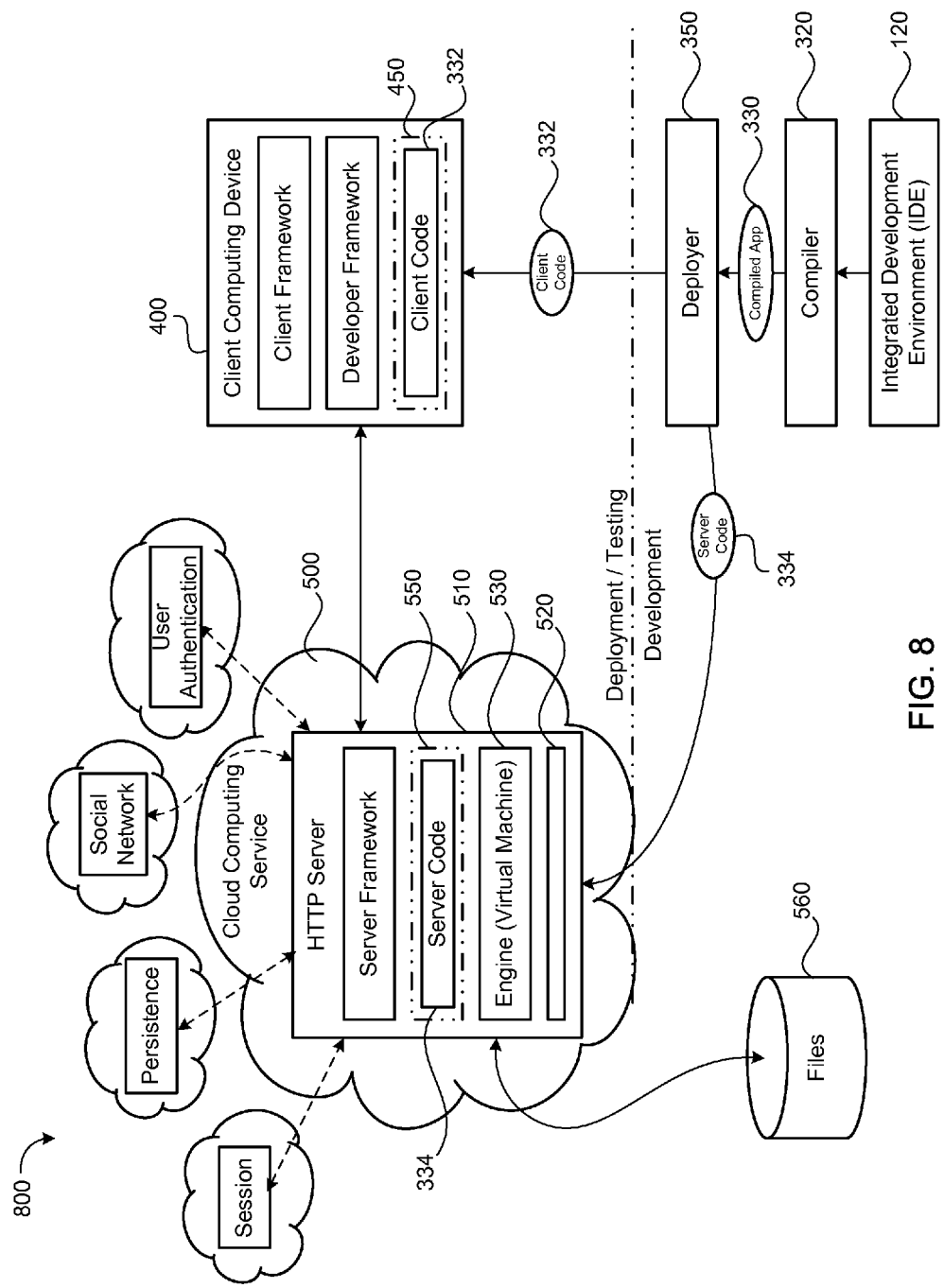
FIG. 8 is a schematic view of example interactions among a cloud computing service, a client computing device, a deployer, a compiler, and an integrated development environment.

Referring to FIG. 8, in some implementations, an example system 800 includes at least one of the local computing device 110 (e.g., a computer), the client computing device 400, and the cloud computing service 500. The local computing device 110 executes the IDE 120, and may also execute the compiler 320 and the deployer 350. In some examples the IDE 120 includes the compiler 320, the debugger 340, and the deployer 350. The cloud computing service 500 includes at least one server computing device 510 which may include a service abstraction layer 520 and a hypertext transfer protocol wrapper over the server virtual machine 530 instantiated thereon. The server computing device 510 may be configured to parse HTTP requests and send HTTP responses. The deployer 350 is configured to receive the executable application 330 (e.g., from the compiler 320, which may be part of the IDE 120) for deployment to a deployment space 450, 550 (e.g., according to a user preference).

In the example illustrated in FIG. 8, the compiler 320 is configured to produce the executable client and server applications 332, 334 for deployment to a respective client deployment space 450 and a server deployment space 550. Each deployment space 450, 550 is associated with a name and a permissions requirement. The server deployment space 550 is in a cloud computing service 500 having a plurality of computing devices 510 and a service abstraction layer 520. In some implementations, the deployer 350 is configured to verify user credentials before deploying the executable application 330. Deploying the executable application 330 may include associating the executable client and server applications 332, 334 with the respective deployment spaces 450, 550, and installing the executable client and server applications 332, 334 to a corresponding client computing device 400 and a server computing device 510 in the cloud computing service 500. In some examples, the server computing device 510 is selected from the plurality of server computing devices 510 in the cloud computing service 500 by evaluating a computing load for each server computing device 510. The cloud computing service 500 may assign a permanent unique URL to the server deployment space 550, which may be mapped to a user-selected domain name. Also, the cloud computing service 500 may process a permissions requirement of the server deployment space 550, and manage access to the executable server application 334 according to the permissions requirement of the server deployment space 550. In some examples, the cloud computing service 500 manages access to the executable server application 334 by requiring at least one of a user name and password to access the permanent unique URL. A virtual machine 530 on the server computing device 510 is configured to execute the executable server application 334 and communicate with the client computing device 400 for execution of the executable client application 332.

In some examples, the cloud computing service 500 is configured to communicate with a repository 560 (e.g., database, file server, etc.) for storing and accessing at least one of the executable application 330 and the executable client and server applications 332, 334. In the example shown in FIG. 8, the server computing device 510 (e.g., HTTP server) communicates with the repository 560 for accessing and executing the executable client and server applications 332, 334.

Figure 9:
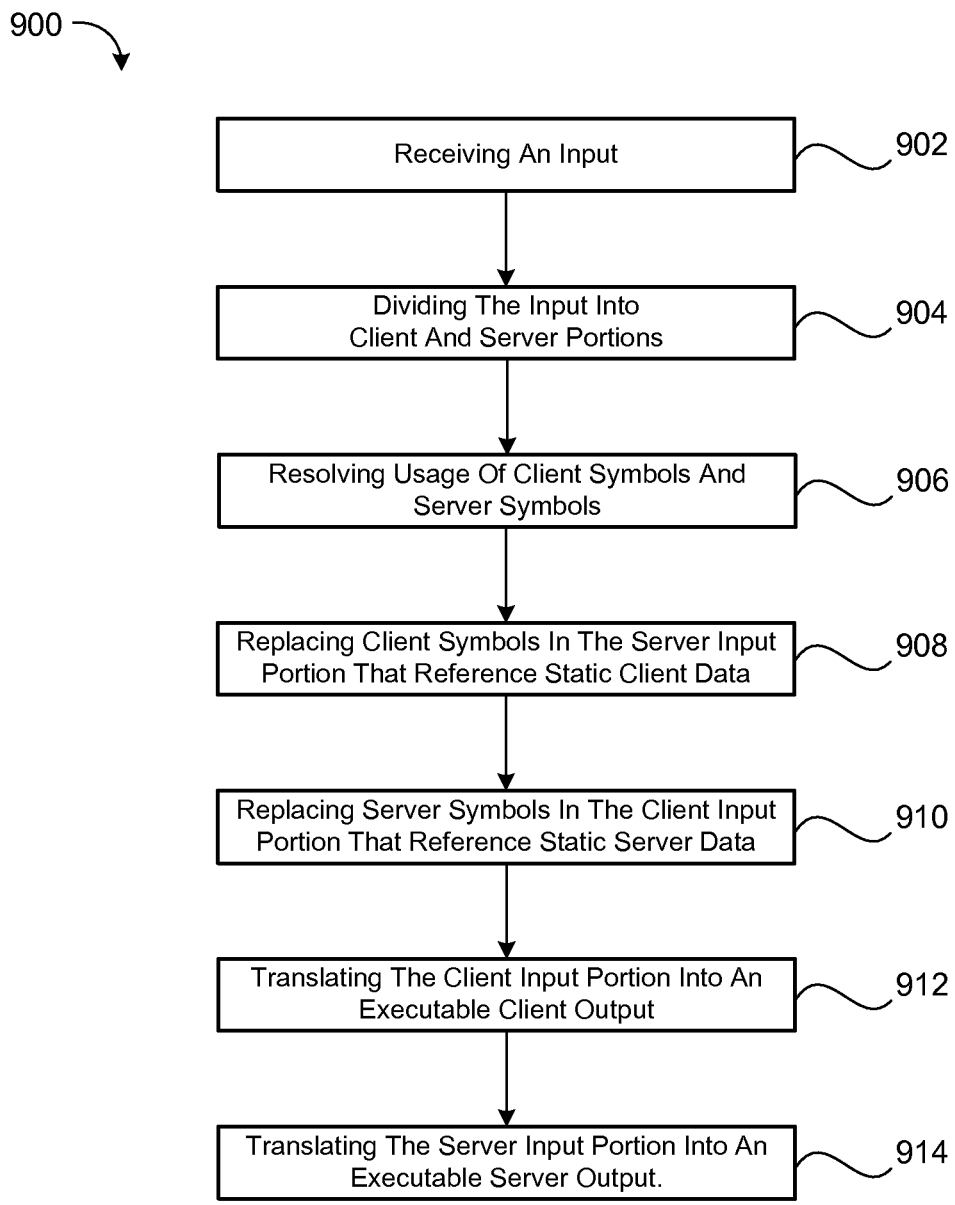
FIG. 9 is a flowchart that represents example operations of a compiler.
Figure 10:
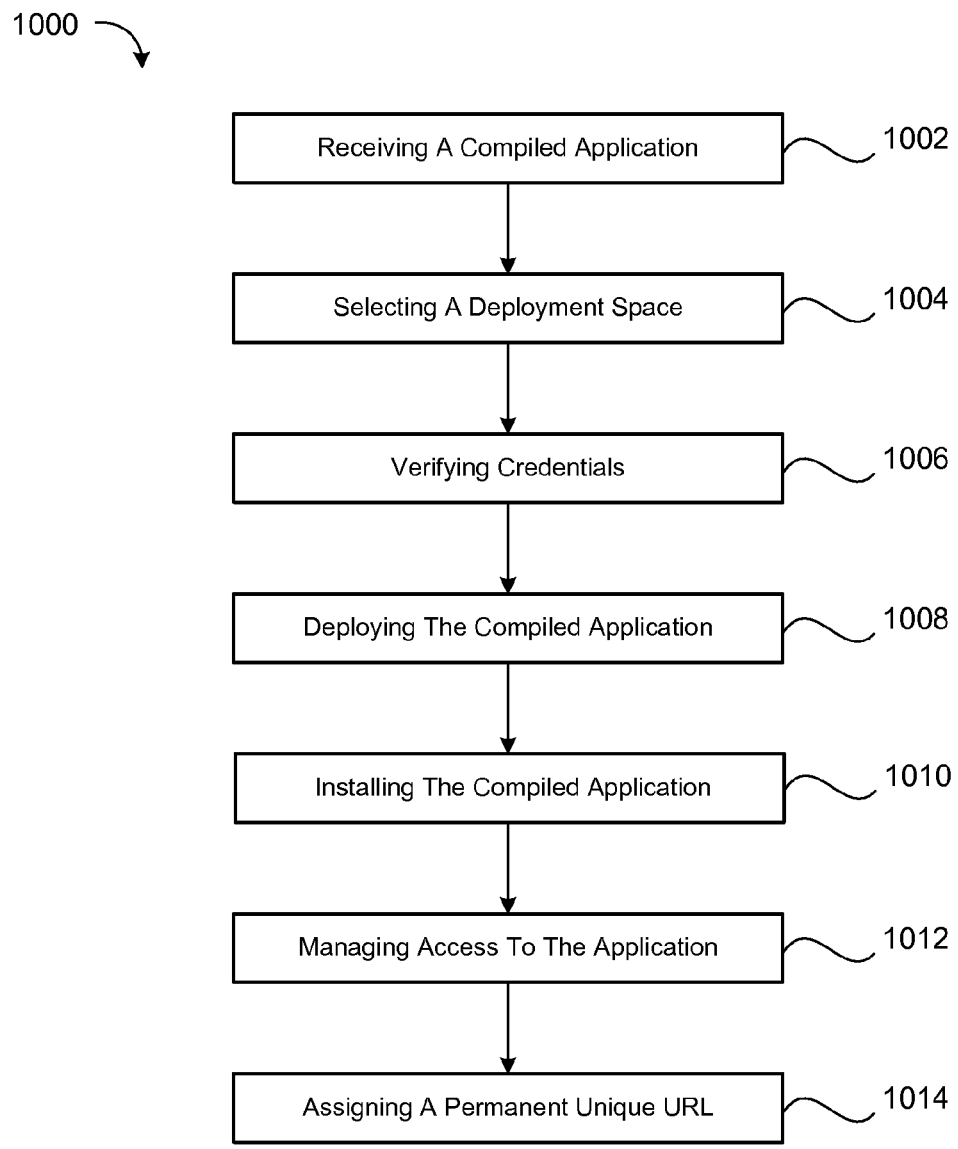
FIG. 10 is a flowchart that represents example operations of a deployer.

Referring to FIG. 9, a flowchart 900 represents an arrangement of compiling operations of the compiler 320. Typically, the compiling operations are executed on a processor present in the computer 110, upon which the compiler 320 resides; however, the compiling operations may also be executed by multiple processors present in the computer 110. While typically executed by a single computer 110 (e.g., electronic device or computing device), in some arrangements, operation execution may be distributed among two or more computers 110. Compiling operations include receiving 902 an input, dividing 904 the input into a client portion and a server portion, resolving 906 the usage of client symbols and server symbols among the client and server input portions, replacing 908 any client symbols in the server input portion that reference static client data of the client input portion with the static client data, and replacing 910 any server symbols in the client input portion that reference static server data of the server input portion with the static server data. Compiling operations also include translating 912 the client input portion into an executable client output, and translating 914 the server input portion into an executable server output. The operation of dividing the input into the client and server input portions may include applying a criteria to the input for selecting the two portions. In some examples, the operation of dividing the input into the client and server input portions is implemented by identifying server portion tags and parsing out the portions within those tags. Compiling operations may also include producing one or more communication services to support the usage of any non-replaceable client symbols in the server input portion and any non-replaceable server symbols in the client input portion. Each communication service marshals information between the executable client and server applications Referring to FIG. 10, a flowchart 1000 represents an arrangement of deploying operations of the deployer 350. Typically, the deploying operations are executed on a processor present in the computer 110, upon which the deployer 350 resides; however, the operations may also be executed by multiple processors present in the computer 110. While typically executed by a single computer 110 (e.g., electronic device or computing device), in some arrangements, operation execution may be distributed among two or more computers 110. Deploying operations include receiving 1002 a executable application 330 (e.g., from a compiler 320 and/or IDE 120) having executable client and server applications 332, 334, receiving 1004 a client portion deployment space location, receiving 1006 a server portion deployment space location, and in response to receiving a deployment request (e.g., via the GUI 122 of the IDE 120), deploying 1008 the executable client application portion to a client deployment space 450 according to the received client portion deployment space location, and also in response to receiving the deployment request, deploying 1010 the executable server application portion to a server deployment space 550 according to the received server portion deployment space location. Example client portion deployment space locations may include at least one of a local computing device 110 and a client computing device 400 having a plurality of computing devices and a service abstraction layer. Example server portion deployment space locations may include at least one of a local computing device 110 and a cloud computing service 500 having a plurality of computing devices 510 and a service abstraction layer 520. Each deployment space 450, 550 may be associated with a name and a permissions requirement. Deploying operations may also include verifying user credentials before deploying the corresponding executable client and server applications 332, 334, associating the corresponding executable client and server applications 332, 334 with a computing device of the designated deployment space 450, 550, and installing the corresponding executable applications 332, 334 to that computing device. Deploying operations may also include managing access to the corresponding executable client and server applications 332, 334 according to a permissions requirement of the respective deployment space 450, 550. Deploying operations can include assigning a permanent unique URL to each deployment space 450, 550 and mapping the permanent unique URL to a user-selected domain name.

Figure 11:
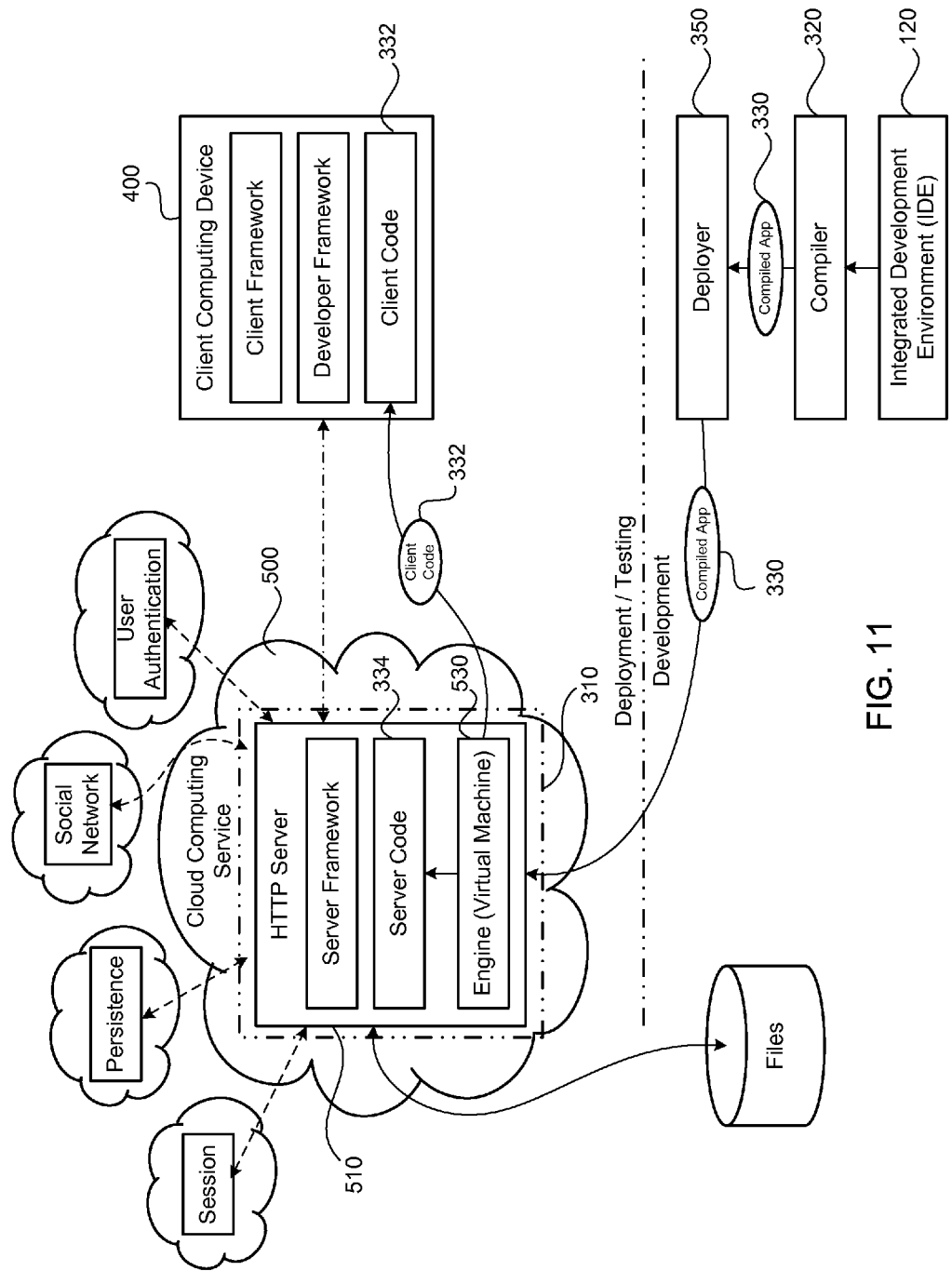
FIGS. 11 and 12 are schematic views of example interactions among a cloud computing service, a client computing device, a deployer, a compiler, and an integrated development environment (IDE) for deploying a compiled application.

In the example illustrated in FIG. 11, the deployer 350 is configured to receive the executable application 330 (e.g., from the compiler 320) for deployment to the server deployment space 550. A user preference may be set in the IDE 120 (e.g., via metadata, specific class usage in the source code, and/or properties) for producing the executable client and server applications 332, 334 at run-time from the executable application 330. Deploying the executable application 330 may include associating the executable application 330 with the server deployment space 550, and installing the executable application 330 to a server computing device 510 in the cloud computing service 500. In some examples, the server computing device 510 is selected from the plurality of server computing devices 510 in the cloud computing service 500 by evaluating a computing load for each server computing device 510. The cloud computing service 500 may assign a permanent unique URL to the server deployment space 550, which may be mapped to a user-selected domain name. Also, the cloud computing service 500 may process a permissions requirement of the server deployment space 550, and manage access to the executable application 330 according to the permissions requirement of the server deployment space 550. In some examples, the cloud computing service 500 manages access to the executable application 330 by requiring at least one of a user name and password to access the permanent unique URL. In the illustrated example, the virtual machine 530 on the server computing device 510 receives the executable application 330 and is configured to produce the server and client applications 332, 334, for example by applying a criteria. The criteria may include selecting portions of the executable application 330 that have an execution time on the client computing device 400 less than a threshold client execution time and/or relate to a graphical user interface (GUI), and translating those portions into the executable client application 332. In some examples, the criteria includes selecting portions of the executable application 330 having an execution time on a client computing device 400 greater than a threshold client execution time, invoke services executable on a server computing device 510, and/or invoke application programming interfaces (API) executable on a server computing device 510, and translating those portions into the executable server application 334. The server computing device 410 delivers the executable client application 332 to a client deployment space 450 on a client computing device 400. The virtual machine 530 is configured to execute the executable server application 334 and communicate with the client computing device 400 for execution of the executable client application 332.

Figure 12:
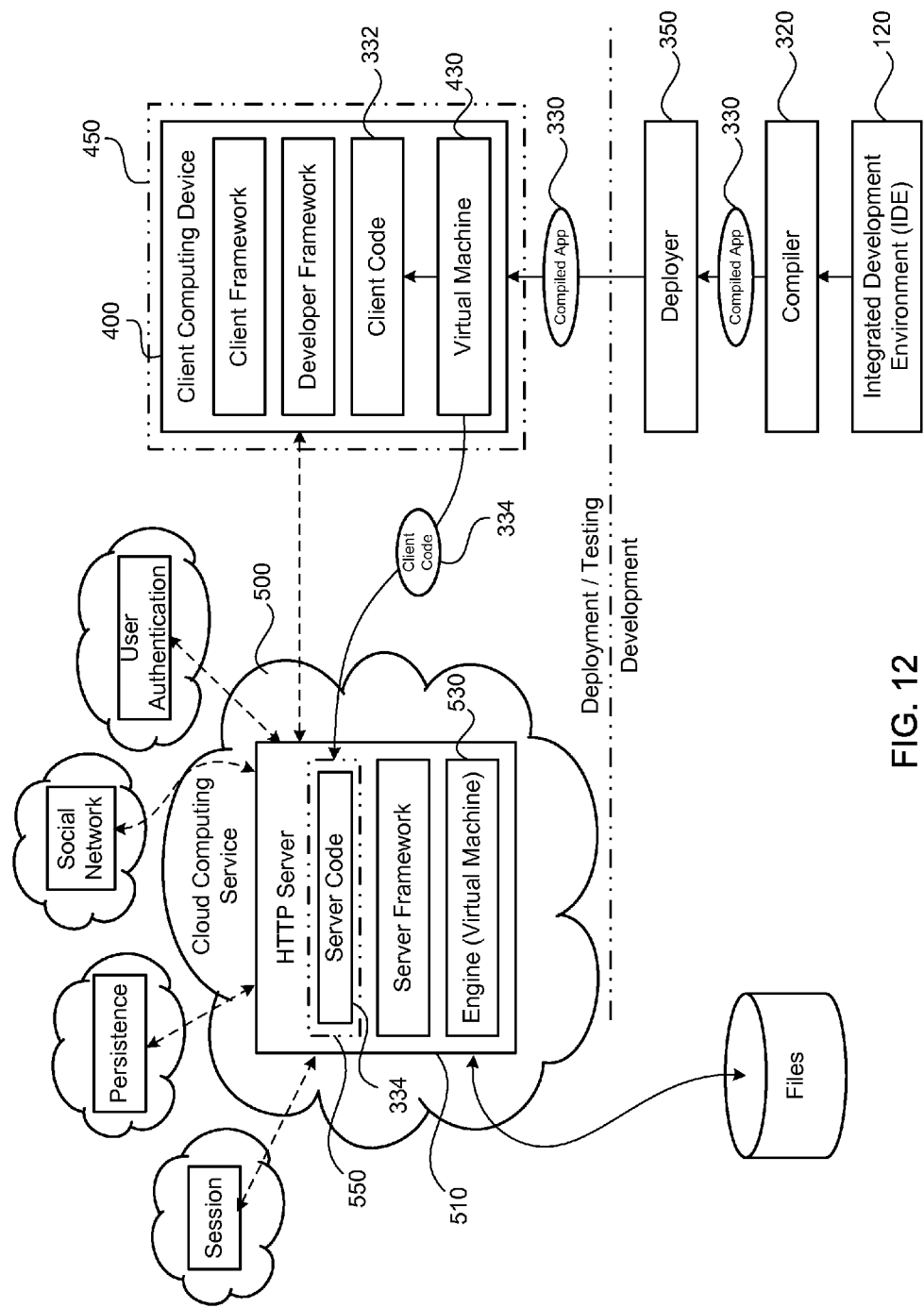

In the example illustrated in FIG. 12, the deployer 350 is configured to receive the executable application 330 (e.g., from the compiler 320) for deployment to the client deployment space 450. A virtual machine 430 on the client computing device 400 receives the executable application 330 and is configured to produce the server and client applications 332, 334, for example by applying a criteria. The criteria may include any of the criteria described herein. The client computing device 400 delivers the executable server application 334 to a server deployment space 550 on a server computing device 510. The virtual machine 430 is configured to execute the executable client application 332 and communicate with the server computing device 510 for execution of the server client application 334. The virtual machine 530 on the server computing device 510 may execute the received server client application 334.

A communication module 336 (shown in FIG. 3) may be produced for communication between the executable client and server applications 332, 334. The communication module 336 may be produced by the compiler 320, the deployer 350, and/or a virtual machine 430, 530. In some examples, the compiler 320 produces the communication module 336 upon producing the executable client and server applications 332, 334. In other examples, the server virtual machine 530 produces the communication module 336 upon producing the executable client and server applications 332, 334 at runtime. The communication module 336 accommodates or facilitates the resolved usage of any client and server symbols between the executable client and server applications 332, 334.

Figure 13:
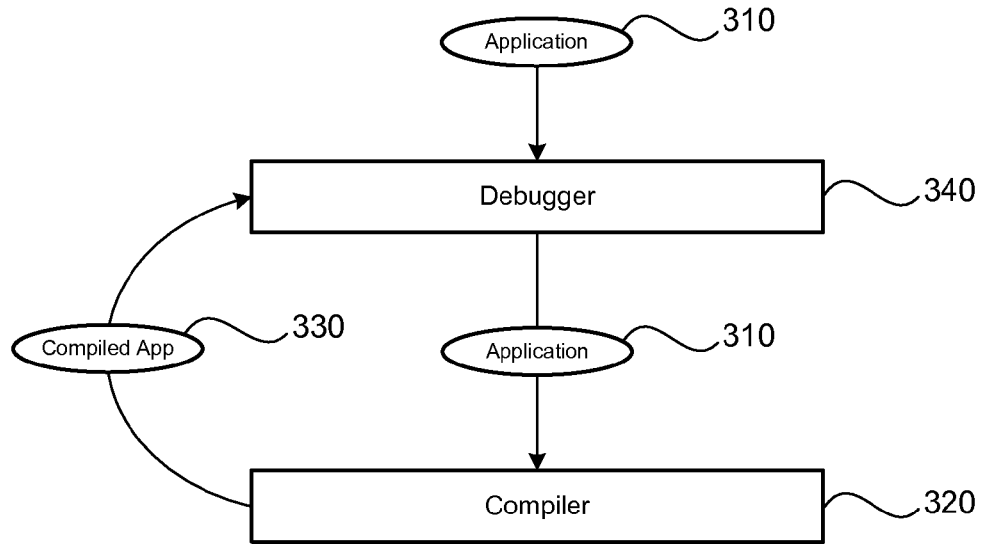
FIG. 13 is a schematic view of an example debugger and an example compiler.

Referring to FIG. 13, in some implementations, the debugger 340 is configured to receive input from the IDE 120, such as the application 310 and/or the executable application 330, for testing and debugging (e.g., identifying and correcting errors). The debugger 340 may be a computer program executable on the computer 110 or another computer. In some implementations, the debugger 340 uses artifacts (e.g., translated code, symbol table, and/or any special debugging output) in the executable application 330 for debugging the application. In other implementations, the debugger 340 communicates with the compiler 320 to debug compilation and/or execution of the executable application 330. In some examples, the source code of the application 310 to be monitored and/or examined by the debugger 340 may be executed on an instruction set simulator (ISS), which allows an execution sequence of the application 310 to be halted when specific conditions are encountered. In some implementations, the compiler 320 and the debugger 340 are part of the IDE 120 and communicate with each other for execution and testing of the application 310. While running the executable application 330 produced by the compiler 320, the debugger 340 may show the position in the original source code of the application 310 when the executable application 330 crashes or otherwise experiences an error and cannot continue to execute properly. In some examples, the debugger 340 is configured to offer the following operations while running the application 310: executing step by step (e.g., single-stepping), stopping execution (e.g., breaking or pausing the application to examine the current state) at some kind of event by way of a breakpoint, for example, and tracking values of variables in the application 310. In some examples, the debugger 340 is configured to modify the state of the executable application 330 while running executable application 330, rather than merely to observe it.

Figure 14:
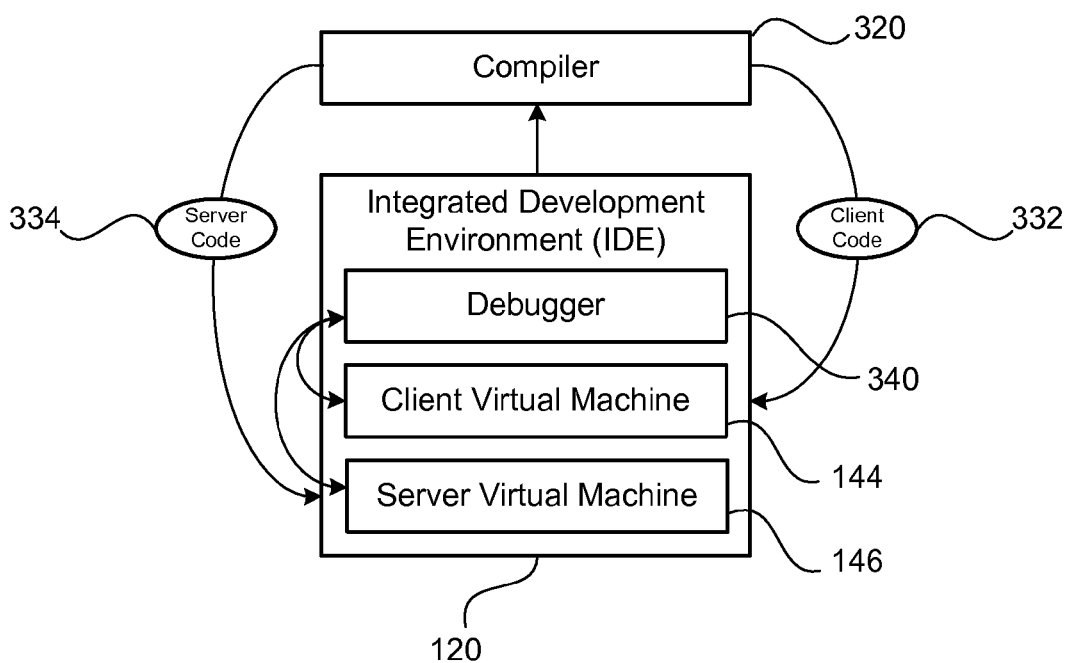
FIG. 14 is a schematic view of an example debugger testing portions of a compiled application on virtual machines instantiated by an integrated development environment (IDE).

In some implementations, the debugger 340 is configured to receive a user testing preference for selecting a testing location of the executable client and server applications 332, 334. For example, the user may set the user testing preference for testing the executable application 330 (both the executable client and server applications 332, 334) on a local computing device 110 executing the IDE 120. In the example shown in FIG. 14, the debugger 340 is part of the IDE 120 and communicates with the compiler 320 to receive the executable client and server applications 332, 334. The compiler 320 is shown separate from the IDE 120, but may be incorporated in the IDE 120. Similarly, the debugger 340 is shown part of the IDE 120, but may be separate from and communicates with the IDE 120. The compiler 320, debugger 340, and IDE 120 are shown as executing on a computer 110; however, each of them may be executed on one or more separate computers or services communicating with one another. The debugger 340 is configured to run or execute the executable client application 332 on a local client virtual machine 144 instantiated by the IDE 120 and run the executable server application 334 on a local server virtual machine 146 instantiated by the IDE 120. The debugger 340 communicates with the local client and server virtual machines 144, 146 for monitoring execution of the executable client and server application 332, 334. A virtual machine (VM) is a software implementation of a machine (e.g., a computer) that executes programs like a real machine. For example, a program written in Java receives services from a Java Runtime Environment (JRE) software program by issuing commands from which the expected result is returned by the Java software. By providing these services to the program, the JRE software is acting as a "virtual machine", taking the place of the operating system or hardware for which the program would ordinarily have had to have been specifically written. The debugger 340 may communicate with the virtual machines 144, 146 over a network in an example format of extensible markup language (XML), JSON, plain text, or a binary protocol. For example, the debugger 340 may communicate over TCP/IP sockets using hyper-text transfer protocol (HTTP). If both the client and server virtual machines are executing on the same computer, communication may occur through shared memory.

Figure 15:
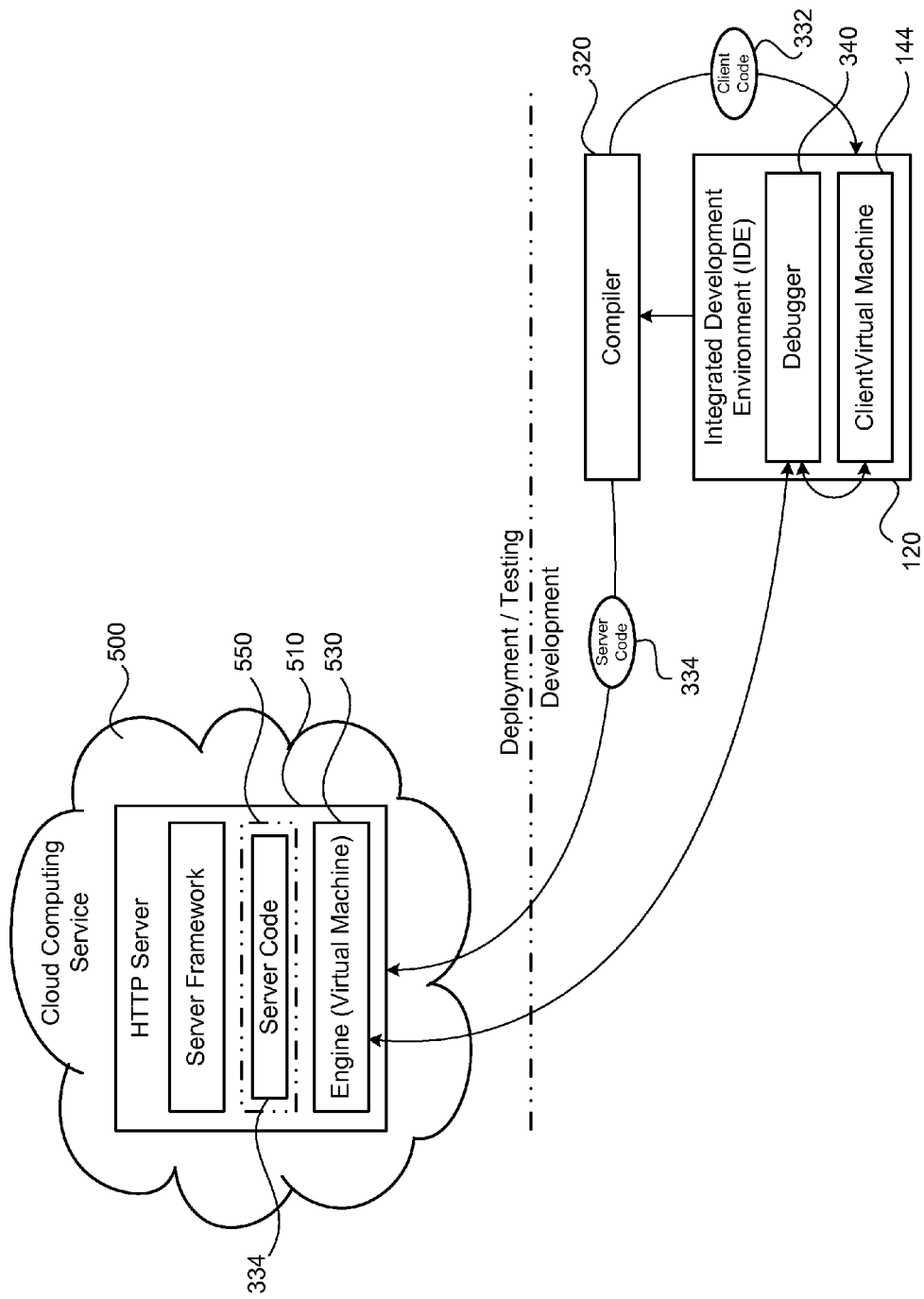
FIG. 15 is a schematic view of a debugger testing portions of a compiled application on a local virtual machine instantiated by an integrated development environment (IDE) and on server virtual machine instantiated by a cloud computing service.

In some examples, the user sets the testing preference for testing the executable client application 332 on a local computing device 110 (e.g., the computing device executing the IDE 120), and test the executable server application 334 on the cloud computing service 500. In the example shown in FIG. 15, the debugger 340 is configured to run or execute the executable client application 332 on the local client virtual machine 144 instantiated by the IDE 120 and run the executable server application 334 on the server virtual machine 530 instantiated by the server computing device 510 in the cloud computing service 400. The debugger 340 communicates with the local client virtual machines 144 and the server virtual machine 530 for monitoring execution of the executable client and server applications 332, 334.

Figure 16:
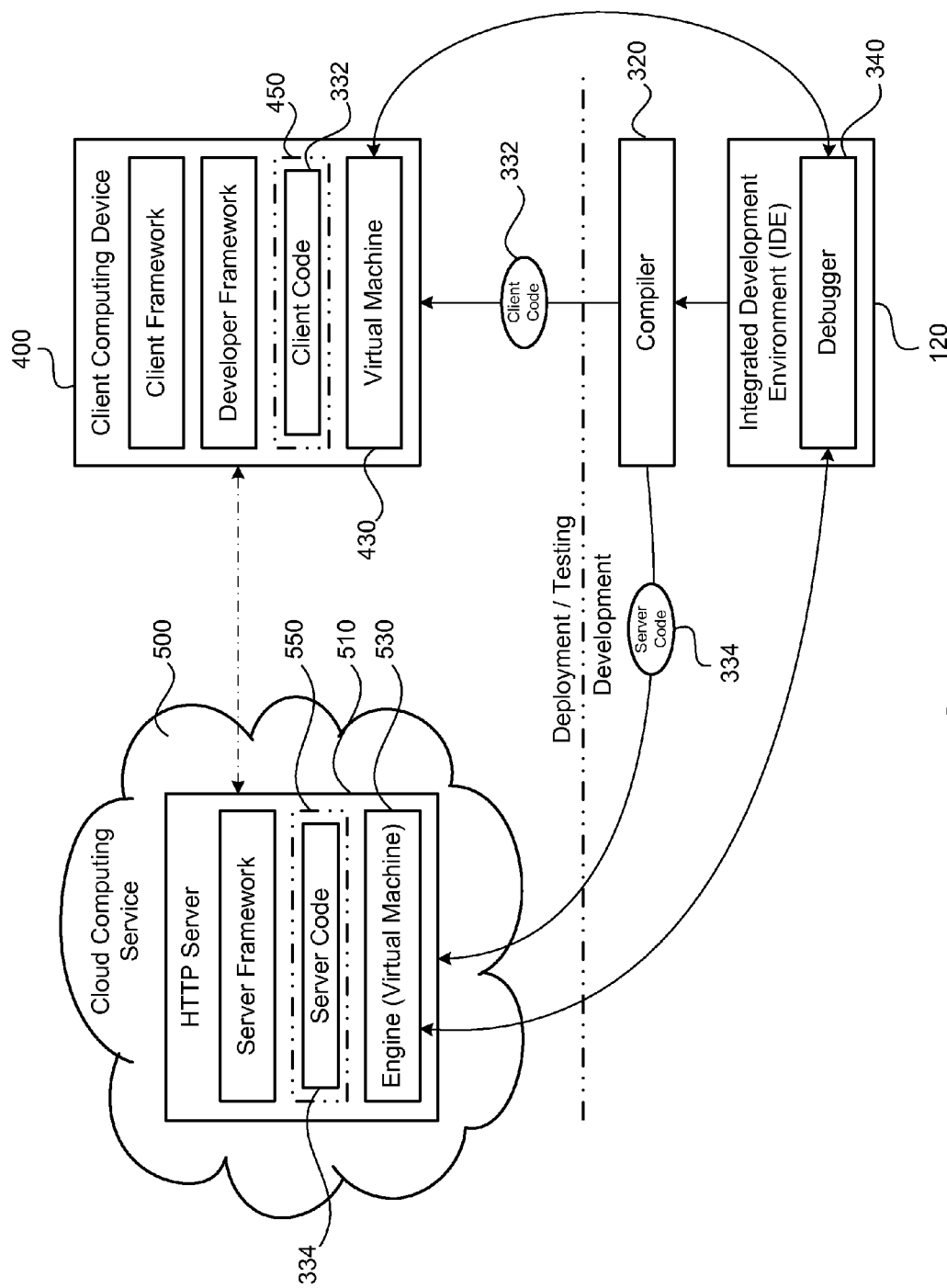
FIG. 16 is a schematic view of a debugger testing portions of a compiled application on virtual machines instantiated by a cloud computing service and a client computing device.

In some examples, the user sets the testing preference for testing the executable client application 332 on the client computing device 400, and test the executable server application 334 on the cloud computing service 500. In the example shown in FIG. 16, the debugger 340 is configured to run or execute the executable client application 332 on a client virtual machine 430 instantiated by the client computing device 400 and run the executable server application 334 on the server virtual machine 530 instantiated by the server computing device 510 in the cloud computing service 500. The debugger 340 communicates with the client virtual machine 430 and the server virtual machine 530 for monitoring execution of the executable client and server applications 332, 334.

Figure 17:
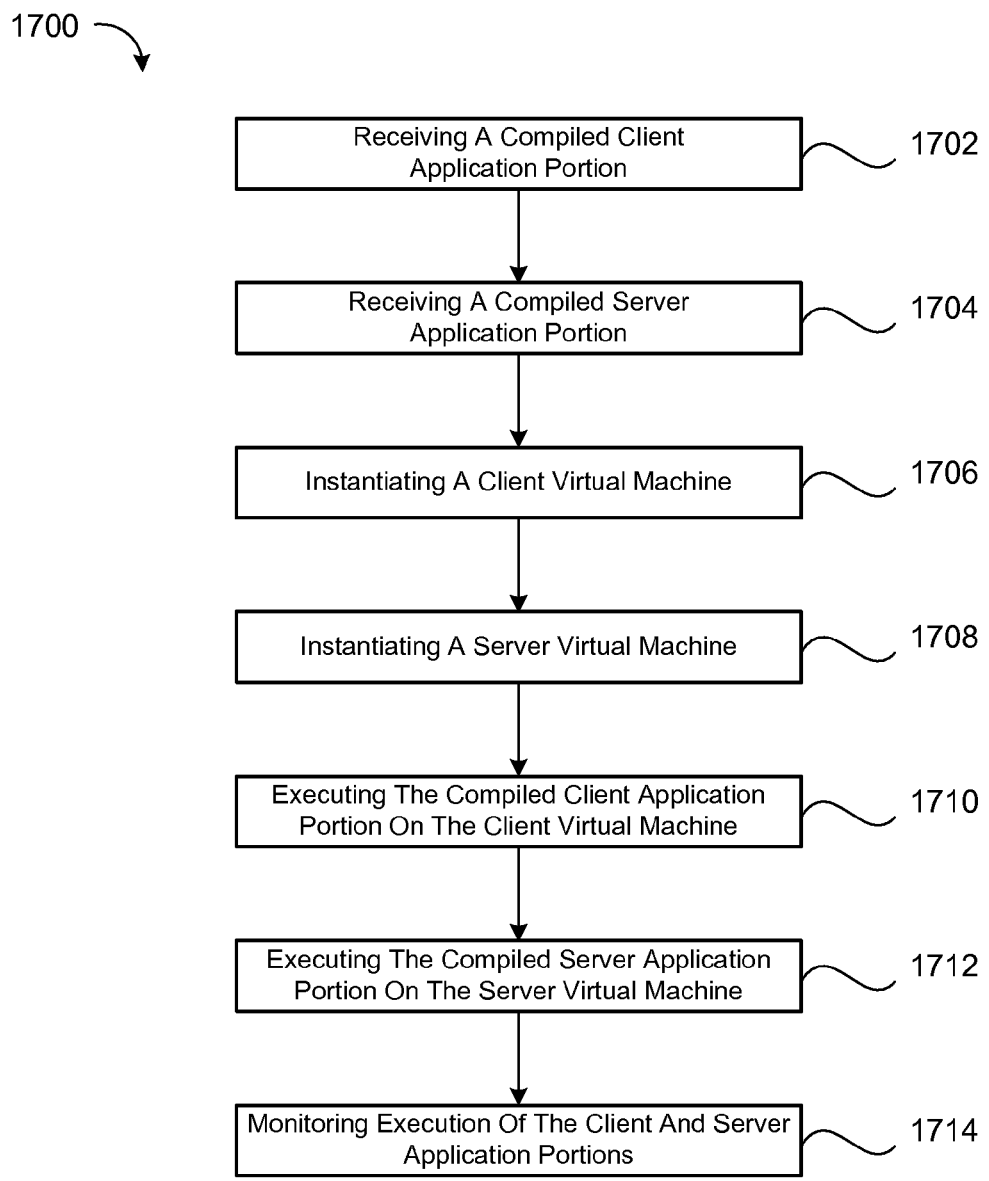
FIG. 17 is a flowchart that represents example operations of a debugger.

Referring to FIG. 17, a flowchart 1700 represents an arrangement of debugging operations of the debugger 340. Typically, the debugging operations are executed on a processor present in the computer 110, upon which the debugging 340 resides; however, the operations may also be executed by multiple processors present in the computer 110. While typically executed by a single computer 110 (e.g., electronic device or computing device), in some arrangements, operation execution may be distributed among two or more computers 110. Debugging operations include receiving 1702 a executable client application 332, receiving 1704 a executable server application 334, instantiating 1706 a client virtual machine 144, 430, and instantiating 1708 a server virtual machine 146, 530. Debugging operations include executing 1710 the executable client application 332 on the client virtual machine 144, 430, executing 1712 the executable server application 334 on the server virtual machine 146, 530, and monitoring 1714 execution of the executable client and server application 332, 334, as by communicating with the local and server virtual machines 144, 146, 430, 530. In some implementations, debugging operations include receiving a testing location preference, such as testing the one or both of the executable client and server applications 332, 334 on one or more of a local machine 110, a cloud computing service 500, and a client computing device 400. The client virtual machine 144, 430 is instantiated on the local computing device 110 for testing the executable client application 332 thereon. Similarly, the server virtual machine 146, 530 is instantiated on the local computing device 110 for testing the executable server application 334 thereon. For testing on the cloud computing service 500, the server virtual machine 146, 530 is instantiated on a server computing device 510 in the cloud computing service 500 for executing the executable server application 334. For testing on the client computing device 500, client virtual machine 144, 430 is instantiated on the client computing device 400 for executing the executable client application 332. Monitoring execution of the executable application 330 may include providing a source code location of the application 310 related to a failure of the executable application 330, executing the executable application 330 step-by-step of the application source code, stopping execution of the executable application 330 for providing a variable state, and modifying a state of the executed executable application 330.

Various implementations of the systems and techniques described here (e.g., the compiler 320, the debugger 340, and the deployer 350) can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

The invention claimed is:

1. A computer implemented method comprising:
   receiving a client programming language input and a server programming language input, wherein client symbols of the client programming language input are usable in the server programming language input and server symbols of the server programming language input are usable in the client programming language input;
   identifying the usage of one or more client symbols in the server programming language input and one or more server symbols in the client programming language input;
   replacing the one or more client symbols in the server programming language input that represent static client data of the client programming language input with the static client data;

replacing the one or more server symbols in the client programming language input that represent static server data of the server programming language input with the static server data;
producing one or more communication services to support the usage of one or more non-replaceable client symbols in the server programming language input and the usage of one or more non-replaceable server symbols in the client programming language input; and
translating the client programming language input into an executable client application and the server programming language input into an executable server application, the executable client and server applications operable to communicate with each other;
wherein each communication service marshals information between the executable client and server applications.

2. The computer implemented method of claim 1, further comprising combining each communication service that marshals information between the executable client and server applications to a common procedure of one of the executable client and server applications.

3. The computer implemented method of claim 1, further comprising receiving a main programming language input comprising the client programming language input and the server programming language input and parsing the main programming language input to separate the client programming language input from the server programming language input.

4. The computer implemented method of claim 3, wherein parsing the main programming language input comprises identifying metadata indicating inclusion in the server programming language input.

5. The computer implemented method of claim 1, wherein symbols of the client programming language input and symbols of the server programming language input share a common namespace.

6. The computer implemented method of claim 1, further comprising translating the client programming language input into a respective executable client application portion with a first compiler and translating the server programming language input into a respective executable server application portion with a second compiler.

7. The computer implemented method of claim 6, further comprising selecting the first and second compilers based on at least one of the received client programming language input and/or the received server programming language input, an executable format of the executable client application and/or the executable server application, and a platform for executing the executable client application.

8. A computer program product, encoded on a non-transitory computer readable medium, operable to cause a data processing apparatus to perform operations comprising:
receiving a client programming language input and a server programming language input, wherein client symbols of the client programming language input are usable in the server programming language input and server symbols of the server programming language input are usable in the client programming language input;
identifying the usage of one or more client symbols in the server programming language input and one or more server symbols in the client programming language input;
replacing the one or more client symbols in the server programming language input that represent static client data of the client programming language input with the static client data;
replacing the one or more server symbols in the client programming language input that represent static server data of the server programming language input with the static server data;
producing one or more communication services to support the usage of one or more non-replaceable client symbols in the server programming language input and the usage of one or more non-replaceable server symbols in the client programming language input; and
translating the client programming language input into an executable client application and the server programming language input into an executable server application, the executable client and server applications operable to communicate with each other;
wherein each communication service marshals information between the executable client and server applications.

9. The computer program product of claim 8, wherein the operations performed by the data processing apparatus further comprise combining each communication service that marshals information between the executable client and server applications to a common procedure of one of the executable client and server applications.

10. The computer program product of claim 8, wherein the operations performed by the data processing apparatus further comprise receiving a main programming language input comprising the client programming language input and the server programming language input and parsing the main programming language input to separate the client programming language input from the server programming language input.

11. The computer program product of claim 10, wherein parsing the main programming language input comprises identifying metadata indicating inclusion in the server programming language input.

12. The computer program product of claim 8, wherein symbols of the client programming language input and symbols of the server programming language input share a common namespace.

13. The computer program product of claim 8, wherein the operations performed by the data processing apparatus further comprise translating the client programming language input into a respective executable client application portion with a first compiler and translating the server programming language input into a respective executable server application portion with a second compiler.

14. The computer program product of claim 13, wherein the operations performed by the data processing apparatus further comprise selecting the first and second compilers based on at least one of the received client programming language input and/or the received server programming language input, an executable format of the executable client application and/or the executable server application, and a platform for executing the executable client application.

15. A system comprising:
a non-transitory computer-readable medium including instructions; and
a computing device including one or more processors configured to execute the instructions and perform operations comprising providing a compiler configured for:
receiving a client programming language input and a server programming language input, wherein client symbols of the client programming language input are usable in the server programming language input and server symbols of the server programming language input are usable in the client programming language input;

identifying the usage of one or more client symbols in the server programming language input and one or more server symbols in the client programming language input;

replacing the one or more client symbols in the server programming language input that represent static client data of the client programming language input with the static client data;

replacing the one or more server symbols in the client programming language input that represent static server data of the server programming language input with the static server data;

producing one or more communication services to support the usage of one or more non-replaceable client symbols in the server programming language input and the usage of one or more non-replaceable server symbols in the client programming language input; and translating the client programming language input into an executable client application and the server programming language input into an executable server application, the executable client and server applications operable to communicate with each other; wherein each communication service marshals information between the executable client and server applications.

16. The system of claim 15, wherein the compiler combines each communication service that marshals information between the executable client and server applications to a common procedure of one of the executable client and server applications.

17. The system of claim 15, wherein the compiler receives a main programming language input comprising the client programming language input and the server programming language input and parses the main programming language input to separate the client programming language input from the server programming language input.

18. The system of claim 17, wherein parsing the main programming language input comprises identifying metadata indicating inclusion in the server programming language input.

19. The system of claim 15, wherein symbols of the client programming language input and symbols of the server programming language input share a common namespace.

20. The system of claim 15, wherein the compiler translates the client programming language input into a respective executable client application portion with a first compiler and translating the server programming language input into a respective executable server application portion with a second compiler.

21. The system of claim 20, wherein the compiler selects the first and second compilers based on at least one of the received client programming language input and/or the received server programming language input, an executable format of the executable client application and/or the executable server application, and a platform for executing the executable client application.

* * * * *